United States Patent
Takahashi et al.

(10) Patent No.: US 9,707,971 B2
(45) Date of Patent: Jul. 18, 2017

(54) DRIVING CHARACTERISTICS DIAGNOSIS DEVICE, DRIVING CHARACTERISTICS DIAGNOSIS SYSTEM, DRIVING CHARACTERISTICS DIAGNOSIS METHOD, INFORMATION OUTPUT DEVICE, AND INFORMATION OUTPUT METHOD

(71) Applicant: Hitachi, Ltd., Chiyoda-ku, Tokyo (JP)

(72) Inventors: Toshimitsu Takahashi, Tokyo (JP); Tatsuaki Osafune, Tokyo (JP); Yoshifumi Izumi, Tokyo (JP); Noboru Kiyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 138 days.

(21) Appl. No.: 14/720,033

(22) Filed: May 22, 2015

(65) Prior Publication Data

US 2016/0101785 A1    Apr. 14, 2016

(30) Foreign Application Priority Data

Oct. 9, 2014    (JP) .................................. 2014-208365

(51) Int. Cl.
*B60W 40/09*    (2012.01)
*B60K 35/00*    (2006.01)
(Continued)

(52) U.S. Cl.
CPC ........... *B60W 40/09* (2013.01); *B60K 28/066* (2013.01); *B60K 35/00* (2013.01); *B60W 50/14* (2013.01);
(Continued)

(58) Field of Classification Search
USPC ......... 701/1, 31.4, 521, 301; 705/1.1, 14.66; 455/99; 340/439
See application file for complete search history.

(56) References Cited

U.S. PATENT DOCUMENTS 6,819,986 B2 * 11/2004 Hong .................. B60R 25/2081
340/439
7,155,321 B2 * 12/2006 Bromley .............. G07C 5/0808
340/989

(Continued)

FOREIGN PATENT DOCUMENTS

EP    2 564 765 A1    3/2013
EP    2 743 118 A1    6/2014
(Continued)

OTHER PUBLICATIONS

SenseFleet: A smartphone-based driver profiling platform; German Castignani; Raphael Frank; 2014 Eleventh Annual IEEE International Conference on Sensing, Communication, and Networking (SECON); Year: 2014; pp. 144-145, DOI: 10.1109/SAHCN.2014.6990337.*

(Continued)

*Primary Examiner* — Cuong H Nguyen
(74) *Attorney, Agent, or Firm* — Foley & Lardner LLP

(57)    ABSTRACT

A driving characteristics diagnosis device, includes: an information acquisition unit that acquires information relating to the operational state of a vehicle; a dangerous driving detection processing unit that detects dangerous driving by a user of the vehicle on the basis of information acquired by the information acquisition unit; a cause estimation processing unit that estimates a cause of the dangerous driving; a driving characteristics diagnosis processing unit that performs diagnosis of driving characteristics for the user on the basis of a result of detection of the dangerous driving by the dangerous driving detection processing unit and the cause of the dangerous driving estimated by the cause estimation processing unit; and a diagnosis result output unit that outputs the result of the diagnosis of driving characteristics (Continued)

diagnosed by the driving characteristics diagnosis processing unit.

10 Claims, 19 Drawing Sheets

(51) Int. Cl.
    *G09B 19/16*     (2006.01)
    *B60W 50/14*     (2012.01)
    *B60K 28/06*     (2006.01)
    *G06K 9/00*     (2006.01)
    *B60W 40/08*     (2012.01)

(52) U.S. Cl.
    CPC ..... *G06K 9/00791* (2013.01); *G06K 9/00845* (2013.01); *G09B 19/167* (2013.01); *B60W 2040/0818* (2013.01); *B60W 2040/0872* (2013.01); *B60W 2520/105* (2013.01); *B60W 2520/125* (2013.01); *B60W 2540/22* (2013.01); *B60W 2540/26* (2013.01); *B60W 2550/10* (2013.01); *B60W 2550/22* (2013.01); *B60W 2550/302* (2013.01); *B60W 2550/308* (2013.01)

(56) References Cited

U.S. PATENT DOCUMENTS

| | | | |
|---|---|---|---|
| 8,170,725 B2* | 5/2012 | Chin | B60W 40/09 340/439 |
| 8,260,515 B2* | 9/2012 | Huang | B60W 40/09 701/1 |
| 8,498,777 B2* | 7/2013 | Sanchez-Prieto Aler | B60W 40/10 340/988 |
| 8,688,312 B2 | 4/2014 | Kondoh et al. | |
| 8,954,226 B1* | 2/2015 | Binion | G06Q 40/08 701/33.4 |
| 2005/0131597 A1* | 6/2005 | Raz | G09B 19/167 701/29.1 |
| 2006/0122749 A1* | 6/2006 | Phelan | G01M 17/00 701/33.4 |
| 2007/0257804 A1 | 11/2007 | Gunderson et al. | |
| 2009/0299857 A1* | 12/2009 | Brubaker | G06Q 30/02 705/14.66 |
| 2010/0023223 A1* | 1/2010 | Huang | B60W 40/09 701/44 |
| 2010/0161175 A1* | 6/2010 | Yamada | E02F 9/26 701/33.4 |
| 2010/0209881 A1* | 8/2010 | Lin | G09B 19/167 434/65 |
| 2010/0209882 A1* | 8/2010 | Lin | G09B 19/167 434/65 |
| 2010/0209884 A1* | 8/2010 | Lin | G09B 19/167 434/65 |
| 2010/0209885 A1* | 8/2010 | Chin | G09B 19/167 434/65 |
| 2010/0209886 A1* | 8/2010 | Lin | G09B 19/167 434/65 |
| 2010/0209888 A1* | 8/2010 | Huang | B60W 40/09 434/65 |
| 2010/0209889 A1* | 8/2010 | Huang | B60W 40/09 434/65 |
| 2010/0209890 A1* | 8/2010 | Huang | G09B 19/167 434/65 |
| 2010/0209892 A1* | 8/2010 | Lin | G09B 19/167 434/71 |
| 2010/0211270 A1* | 8/2010 | Chin | B62D 6/007 701/44 |
| 2010/0250045 A1* | 9/2010 | Miura | B60W 40/09 701/31.4 |
| 2010/0274435 A1* | 10/2010 | Kondoh | B60W 40/09 701/31.4 |
| 2011/0196572 A1* | 8/2011 | Tsuchikiri | B60R 25/00 701/33.4 |
| 2012/0245758 A1* | 9/2012 | Mizuta | B60W 30/182 701/1 |
| 2013/0096731 A1* | 4/2013 | Tamari | G06F 11/3013 701/1 |
| 2013/0135090 A1 | 5/2013 | Granruth | |

FOREIGN PATENT DOCUMENTS

| | | |
|---|---|---|
| JP | 2004-287649 A | 10/2004 |
| JP | 2011-034430 A | 2/2011 |
| JP | 2013-030188 A | 2/2012 |
| JP | 2013-003928 A | 1/2013 |
| WO | WO 2008/127465 A1 | 10/2008 |

OTHER PUBLICATIONS

Measurement of signal use and vehicle turns as indication of driver cognition; Bruce Wallace; Rafik Goubran; Frank Knoefel 2014 36th Annual International Conference of the IEEE Engineering in Medicine and Biology Society; Year: 2014 pp. 3747-3750, DOI: 10.1109/EMBC.2014.6944438.*
Real time dangerous driving status detection;Yong-Ren Huang; 2011 4th International Congress on Image and Signal Processing; Year: 2011, vol. 1 pp. 414-418, DOI: 10.1109/CISP.2011.6099989.*
A Study of Driver Behavior Under Potential Threats in Vehicle Traffic; Lucas Malta; Chiyomi Miyajima; Kazuya Takeda; IEEE Transactions on Intelligent Transportation Systems; Year: 2009, vol. 10, Issue: 2; pp. 201-210, DOI: 10.1109/TITS.2009.2018321.*
Automatic object detection in car-driving sequence using neural network and optical flow analysis; Ajin Joy; V. S. Jayanthi; D. Baskar; 2014 IEEE International Conference on Computational Intelligence and Computing Research Year: 2014; pp. 1-4, DOI: 10.1109/ICCIC.2014.7238330.*
Novel vehicle crash risk detection based on vehicular sensory system; Qingdong Zeng; Chaozhong Wu; Liqun Peng; Haoran Li; 2015 IEEE Advanced Information Technology, Electronic and Automation Control Conference (IAEAC); Year: 2015; pp. 622-626, DOI: 10.1109/IAEAC.2015.7428628.*
Research on Heart Rate Variability to Driver Fatigue Detection of Dangerous Chemicals Vehicles Based on Simulation Analysis; Wang He; 2014 7th International Conference on Intelligent Computation Technology and Automation; Year: 2014; pp. 488-491, DOI: 10.1109/ICICTA.2014.124.*
EEG based fatigue driving detection using wavelet packet sub-band energy ratio; Ning Ye; Yuge Sun; Jie Yang; The 27th Chinese Control and Decision Conference (2015 CCDC); Year: 2015; pp. 3669-3672, DOI: 10.1109/CCDC.2015.7162562.*
Data-driven predictive control of idle speed control for SI engine; Yu Liang; Xiaohua Xie; Yunfeng Hu; Hong Chen; The 27th Chinese Control and Decision Conference (2015 CCDC); Year: 2015; pp. 4535-4540, DOI: 10.1109/CCDC.2015.7162724.*
Behavior Decision and Path Planning for Cognitive Vehicles using Behavior Networks; Joachim Schroder; Markus Hoffmann; Marius Zollner; Rudiger Dillmann; 2007 IEEE Intelligent Vehicles Symposium; Year: 2007; pp. 710-715, DOI: 10.1109/IVS.2007.4290200.*
Study of design directions for lateral vehicle control; J. Guldner; Han-Shue Tan; S. Patwardhan; Proceedings of the 36th IEEE Conference on Decision and Control; Year: 1997, vol. 5; pp. 4732-4737 vol. 5, DOI: 10.1109/CDC.1997.649756.*
European Patent Office extended search report issued in application 15168329.9 dated Feb. 17, 2016; 7 pages.

* cited by examiner

DRIVING CHARACTERISTICS DIAGNOSIS DEVICE, DRIVING CHARACTERISTICS DIAGNOSIS SYSTEM, DRIVING CHARACTERISTICS DIAGNOSIS METHOD, INFORMATION OUTPUT DEVICE, AND INFORMATION OUTPUT METHOD

INCORPORATION BY REFERENCE

The disclosure of the following priority application is herein incorporated by reference: Japanese Patent Application No. 2014-208365 filed Oct. 9, 2014.

BACKGROUND OF THE INVENTION

1. Field of the Invention

The present invention relates to a driving characteristics diagnosis device, to a driving characteristics diagnosis system, to a driving characteristics diagnosis method, to an information output device, and to an information output method.

2. Description of Related Art

In the prior art, driving characteristics diagnosis for estimation and evaluation of the roughness of driving by a driver and of the risk of accident that he presents and so on has been performed by measuring acceleration operation, braking operation, steering operation and so on by the driver, using sensors mounted to the vehicle. Furthermore, the result of this type of driving characteristics diagnosis can also be utilized for a service of providing driving advice to a driver whose accident risk is high, and for a service of varying the charge for automobile insurance according to the driving level of the driver. By taking advantage of these services, a user(driver) is able to enjoy the advantages of reducing his accident rate, of keeping down the cost of his insurance by driving safely, and so on.

In relation to driving characteristics diagnosis, the driving support device for a vehicle described in Japanese Laid-Open Patent Publication 2013-30188 is per se known. This device acquires both short time period data specifying the current vehicle running state and the current driver actions, and medium time period data specifying the running state and driver actions during the current day. And driving diagnosis is performed by comparing the distribution of the short time period data with the distribution of the medium time period data each other, so that the driving diagnosis result is evaluated according to two evaluation standards. Due to this, the conviction conveyed by the diagnosis result is enhanced.

However, with the device described in Japanese Laid-Open Patent Publication 2013-30188, no consideration is given to user action due to the influence of some external cause, such as some other vehicle including a bicycle or a motorcycle or the like, a pedestrian in the neighborhood of the subject vehicle, the environment surrounding the subject vehicle, or the like. Due to this, in some cases the result of diagnosis differ from the result that the user is entitled to expect, so that there is the problem that the conviction that the result convey to the user is low.

SUMMARY OF THE INVENTION

According to the first aspect of the present invention, a driving characteristics diagnosis device, comprises: an information acquisition unit that acquires information relating to the operational state of a vehicle; a dangerous driving detection processing unit that detects dangerous driving by a user of the vehicle on the basis of information acquired by the information acquisition unit; a cause estimation processing unit that estimates a cause of the dangerous driving; a driving characteristics diagnosis processing unit that performs diagnosis of driving characteristics for the user on the basis of a result of detection of the dangerous driving by the dangerous driving detection processing unit and the cause of the dangerous driving estimated by the cause estimation processing unit; and a diagnosis result output unit that outputs the result of the diagnosis of driving characteristics diagnosed by the driving characteristics diagnosis processing unit.

According to the second aspect of the present invention, in the driving characteristics diagnosis device of the first aspect, it is preferred that the result of the driving characteristics diagnosis include information specifying the date, the time, and the location at which the dangerous driving was detected, information specifying the details of the dangerous driving, and information specifying the cause of the dangerous driving.

According to the third aspect of the present invention, in the driving characteristics diagnosis device of the second aspect, it is preferred that the result of the driving characteristics diagnosis further includes information specifying driving advice to the user in relation to the dangerous driving.

According to the fourth aspect of the present invention, in the driving characteristics diagnosis device of the first or second aspect, it is preferred that the cause estimation processing unit estimates the cause of the dangerous driving on the basis of at least one of: information that has been acquired in relation to the vehicle; weather information corresponding to a traveling position of the vehicle; map information corresponding to the traveling position of the vehicle; and road traffic information corresponding to the traveling position of the vehicle.

According to the fifth aspect of the present invention, in the driving characteristics diagnosis device of any one of the first through third aspects, it is preferred that the cause estimation processing unit estimates the cause of the dangerous driving by performing a first decision processing for determining upon a presence or absence of a dangerous driving factor originating in the user, and a second decision processing for determining upon a presence or absence of a dangerous driving factor originating in an external cause external to the user.

According to the sixth aspect of the present invention, in the driving characteristics diagnosis device of the fifth aspect, it is preferred that the first decision processing includes at least one of processing for making a decision as to whether or not the user has performed heedless driving, processing for making a decision as to whether or not the user has performed inattentive driving, processing for making a decision as to whether or not the user has observed an appropriate inter-vehicular distance between the vehicle and another vehicle in front, processing for making a decision as to whether or not the user has been conversing while driving, processing for making a decision as to whether or not the user has operated a device while driving, processing for making a decision as to whether or not the user has abruptly changed the vehicle between road lanes, processing for making a decision as to whether or not the user has performed driving over a long time interval, processing for making a decision as to whether or not the user has performed impatient driving, processing for making a decision as to whether or not the user has performed distracted driving, processing for making a decision as to whether or not the user is tired, processing for making a decision as to whether or not the user has performed drowsy driving, processing for making a decision as to whether or not the user has committed a traffic violation, processing for making a decision as to whether or not the vehicle has changed road lane contrary to the intention of the user, and processing for making a decision as to whether or not the user has performed checking while turning; and the second decision processing includes at least one of processing for making a decision as to whether or not some other vehicle has unreasonably intruded in front of the vehicle, processing for making a decision as to whether or not another vehicle in front of the vehicle has performed abrupt deceleration, processing for making a decision as to whether or not something has jumped out in front of the vehicle, processing for making a decision as to whether or not the forward field of view from the vehicle is poor, and processing for making a decision as to whether or not congestion is occurring at a ground point where the vehicle is traveling.

According to the seventh aspect of the present invention, in the driving characteristics diagnosis device of any one of the first through third aspects, it is preferred that further comprises a blame ratio calculation unit that calculates a blame ratio to be attributed to the user for the dangerous driving; and wherein the result of diagnosis of the driving characteristics further includes information specifying the blame ratio calculated by the blame ratio calculation unit.

According to the eighth aspect of the present invention, in the driving characteristics diagnosis device of the seventh aspect, it is preferred that the cause estimation processing unit estimates the cause of the dangerous driving on the basis of predetermined conditions that are set for each dangerous driving factor; and the blame ratio calculation unit calculates the blame ratio for the user or the external cause influence rate for each dangerous driving factor, and calculates an overall blame ratio to be attributed to the user on the basis of the blame ratios and the influence rates that have thus been calculated.

According to the ninth aspect of the present invention, a driving characteristics diagnosis system, comprises the driving characteristics diagnosis device of any one of the first through eighth aspects, and a terminal device that is connected to the driving characteristics diagnosis device, wherein: the driving characteristics diagnosis device receives information related to the operational state of the vehicle from the terminal device, and transmits to the terminal device the result of the diagnosis of driving characteristics for the user outputted from the diagnosis result output unit; and the terminal device comprises: a communication unit that transmits information related to the operational state of the vehicle to the driving characteristics diagnosis device, and receives the result of the diagnosis of driving characteristics for the user from the driving characteristics diagnosis device; and a diagnosis result display processing unit that performs display processing for displaying the result of the diagnosis of driving characteristics that have been received by the communication unit.

According to the tenth aspect of the present invention, a driving characteristics diagnosis method, comprises the steps of: acquiring information related to an operational state of a vehicle by a computer; detecting dangerous driving by the user of the vehicle, and estimating a cause of the dangerous driving estimated, by the computer on the basis of the information that is acquired; and performing a diagnosis of driving characteristics for the user by the computer on the basis of the result of detection of the dangerous driving and the estimation of the cause of the dangerous driving.

According to the eleventh aspect of the present invention, an information output device wherein when a user has performed dangerous driving of a vehicle, outputs information for display upon a screen including at least one of: date, time, and a location at which the dangerous driving was performed; details of the dangerous driving; a cause of the dangerous driving; a blame ratio to be attributed to the user in relation to the dangerous driving; and driving advice to the user in relation to the dangerous driving.

According to the twelfth aspect of the present invention, an information output method, comprises the step of outputting information by employing the information output device of the eleventh aspect.

According to the present invention, it is possible to give consideration to the influence of external causes, so that it is possible to output driving characteristics diagnosis and information whose conviction to the user (user) is high.

DESCRIPTION OF EMBODIMENTS

Figure 1:
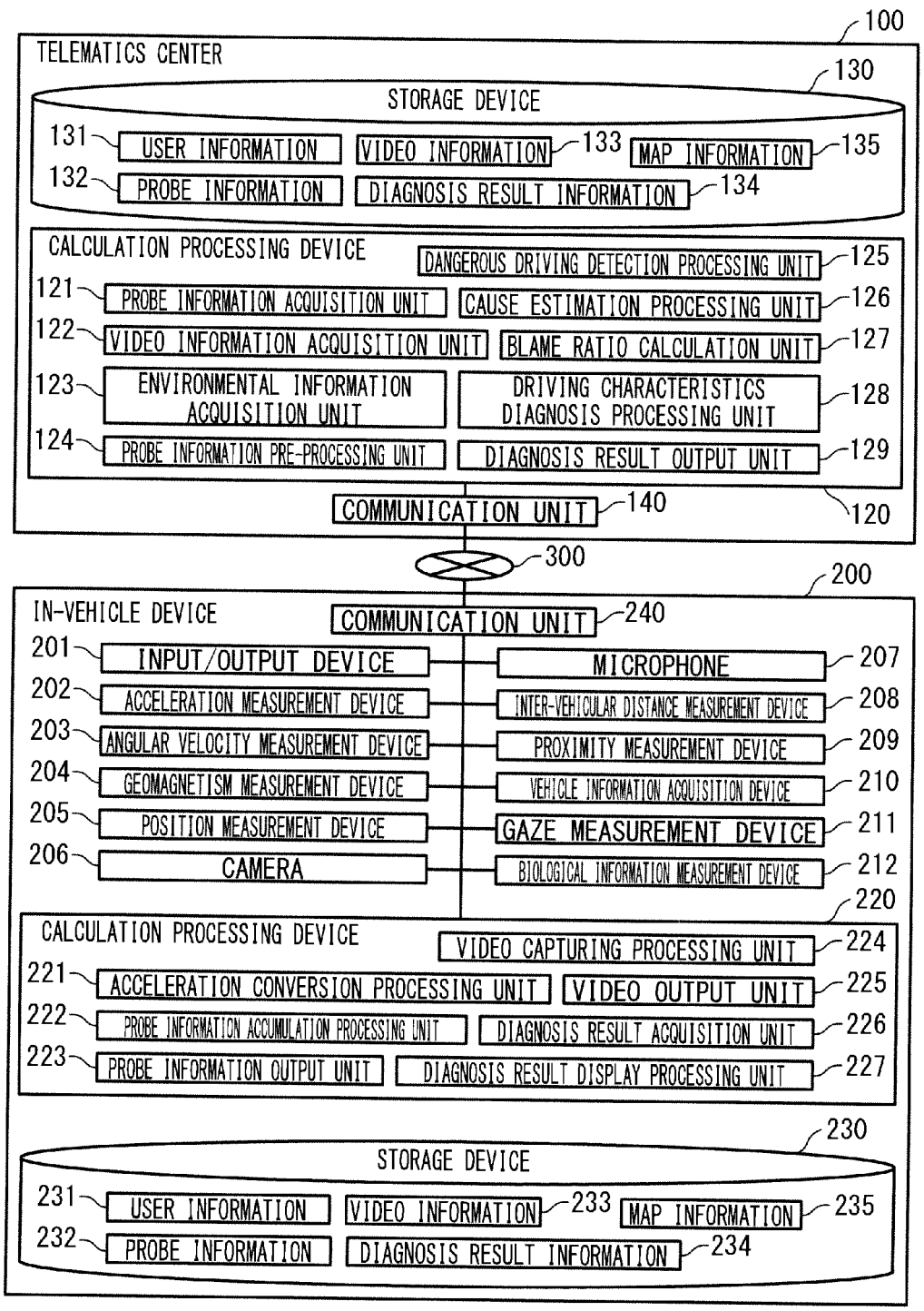
FIG. 1 is a structural diagram of a driving characteristics diagnosis system according to an embodiment of the present invention.

Embodiments of the driving characteristics diagnosis system according to the present invention will now be explained in the following. FIG. 1 is a structural diagram of the driving characteristics diagnosis system according to a first embodiment of the present invention.

First, the structural elements of the system will be explained. This system comprises a telematics center 100 and an in-vehicle device 200. The telematics center 100 and the in-vehicle device 200 are connected together via a network 300 that may include the internet or a mobile telephone network or the like.

The telematics center 100 functions as a driving characteristics diagnosis device according to an embodiment of the present invention. The telematics center 100 comprises a calculation processing device 120, a storage device 130, and a communication unit 140. The calculation processing device 120 is implemented by a CPU or the like that is equipped to a computer such as a server or the like, and executes various types of calculation processing. Functionally, the calculation processing device 120 comprises a probe information acquisition unit 121, a video information acquisition unit 122, an environmental information acquisition unit 123, a probe information pre-processing unit 124, a dangerous driving detection processing unit 125, a cause estimation processing unit 126, a blame ratio calculation unit 127, a driving characteristics diagnosis processing unit 128, and a diagnosis result output unit 129. The storage device 130 is a storage device that utilizes a recording medium such as a hard disk drive or the like. Information such as user information 131, probe information 132, video information 133, diagnosis result information 134, map information 135 and so on is accumulated in the storage device 130.

The user information 131 is information for individually identifying various users who employ the driving characteristics diagnosis system of FIG. 1. The user information 131, for example, may include information such as the ID numbers of users or user's names or the like. It should be understood that while, for the simplicity of explanation, only one in-vehicle device 200 is shown in FIG. 1, actually a plurality of in-vehicle devices 200 may be connected to the telematics center 100 via the network 300, and these terminal devices may support a plurality of users who utilize the driving characteristics diagnosis system.

The probe information 132 is information related to the operational states of the vehicles to which the in-vehicle devices 200 are mounted. The probe information 132, for example, may include measurement data from sensors of various types that are mounted to the in-vehicle devices 200.

The video information 133 is information that has been captured in the vehicles to which the in-vehicle devices 200 are mounted. The video information 133 may, for example, include video data that has been obtained by capturing the scenes around the vehicles during traveling, and/or information such as video data that has been obtained by capturing the users who are driving the vehicles, and the like.

The diagnosis result information 134 is information for providing to the users the result of diagnosis of their driving characteristics. The diagnosis result information 134 is generated by the driving characteristics diagnosis processing unit 128.

The map information 135 is information specifying the positions of roads, their directions, their shapes, their connection relationships, traffic rules and so on.

The probe information acquisition unit 121 acquires probe information 232 transmitted from the in-vehicle device 200 and received by the communication unit 140, and accumulates the data in the storage device 130 as probe information 132. At this time, on the basis of user information 231 that is transmitted along with the probe information 232, the probe information acquisition unit 121 accumulates the probe information 132 in the storage device 130 while classifying the probe information 132 according to the various users to whom it relates.

The video information acquisition unit 122 acquires video information 233 that has been transmitted from the in-vehicle device 200 and received by the communication unit 140, and accumulates the video information 233 in the storage device 130 as video information 133. At this time, on the basis of the user information 231 that is transmitted along with the video information 233, the video information acquisition unit 122 accumulates the video information 133 in the storage device 130 while classifying the video information 133 according to the various users to whom it relates.

The environmental information acquisition unit 123 acquires information related to the surrounding environment while the vehicle is traveling (i.e. environmental information) on the basis of position information specifying the traveling track of the user that is included in the probe information 132 accumulated in the storage device 130. The environmental information may include information related to regulations such as speed limits and the like upon the traveling track, weather information corresponding to the position that the vehicle has reached in its travel, insolation information, road traffic information (congestion information, accident information, and so on) and the like. The environmental information acquisition unit 123 is able to acquire the environmental information via the network 300 from an information supplier not shown in the figures.

The telematics center 100 acquires the various types of information explained above using, respectively, the probe information acquisition unit 121, the video information acquisition unit 122, and the environmental information acquisition unit 123. Due to this, as information related to the operational state of the vehicle, the telematics center 100 is able to acquire the probe information 132, the video information 133, and environmental information of various kinds.

The probe information pre-processing unit 124 performs pre-processing upon the probe information 132 that has been accumulated in the storage device 130, in order to prepare that data 132 for processing by the dangerous driving detection processing unit 125, by the cause estimation processing unit 126, and by the blame ratio calculation unit 127. This pre-processing may, for example, include processing to eliminate a noise component due to vibration or the like from sensor measurement data such as acceleration data or the like included in the probe information 132, processing to extract probe information in the vicinity of an intersection, processing to determine the road classification of the track along which the vehicle is traveling, and so on. It should be understood that there is no need to perform pre-processing of all the above types. Moreover, according to requirements, it would also be possible to perform data conversion processing or the like of various types upon the sensor measurement data, such as, for example, Fourier transformation or the like.

The dangerous driving detection processing unit 125 detects dangerous driving by the user of the vehicle on the basis of the probe information 132. The details of the processing method employed by the dangerous driving detection processing unit 125 for detecting dangerous driving will be explained hereinafter.

The cause estimation processing unit 126 estimates one or more causes for dangerous driving that has been detected by the dangerous driving detection processing unit 125. The details of the processing method employed by the cause estimation processing unit 125 for estimating the cause of dangerous driving will be explained hereinafter.

The blame ratio calculation unit 127 calculates the blame ratio to be assigned to the user for dangerous driving that has been detected by the dangerous driving detection processing unit 125, on the basis of the cause of that dangerous driving as estimated by the cause estimation processing unit 126. The details of the processing method employed by the blame ratio calculation unit 127 for calculating the blame ratio to be assigned to the user will be explained hereinafter.

The driving characteristics diagnosis processing unit 128 performs driving characteristics diagnosis for the user on the basis of the result of processing by the dangerous driving detection processing unit 125, the cause estimation processing unit 126, and the blame ratio calculation unit 127 described above, and accumulates diagnosis result information 134 specifying the result of the diagnosis in the storage device 130. For dangerous driving that has been detected by the dangerous driving detection unit 125, the diagnosis result information 134 includes information specifying the cause that has been estimated by the cause estimation processing unit 126, and information specifying the blame ratio assigned to the user that has been calculated by the blame ratio calculation unit 127.

In response to a request for the result of driving characteristics diagnosis for the user that has been transmitted from the in-vehicle device 200, the diagnosis result output unit 129 outputs the result of driving characteristics diagnosis for that user to the communication unit 140. And, among the diagnosis result information 134 accumulated in the storage device 130, the diagnosis result output unit 129 reads out information corresponding to that user, and outputs the information as the result of diagnosis of his driving characteristics. At this time, it would also be possible, in response to a request from the user, also to transmit result of diagnosis of his driving characteristics corresponding to a specified time point, to a traveling track, to a travel position, or the like. The communication unit 140 transmits the driving characteristics diagnosis result that have been outputted from the diagnosis result output unit 129 to the in-vehicle device 200 via the network 300.

The in-vehicle device 200 comprises an input/output device 201, an acceleration measurement device 202, an angular velocity measurement device 203, a geomagnetism measurement device 204, a position measurement device 205, a camera 206, a microphone 207, an inter-vehicular distance measurement device 208, a proximity measurement device 209, a vehicle information acquisition device 210, a gaze measurement device 211, a biological information measurement device 212, a communication unit 240, a calculation processing device 220, and a storage device 230. The calculation processing device 220 is implemented via a CPU or a GPU or the like, and executes calculation processing of various types. The calculation processing device 220 comprises an acceleration conversion processing unit 221, a probe information accumulation processing unit 222, a probe information output unit 223, a video capturing processing unit 224, a video output unit 225, a diagnosis result acquisition unit 226, and a diagnosis result display processing unit 227. The storage device 230 performs storage by utilizing a recording medium such as a hard disk drive, a solid state drive, an SD card, or the like. Information such as user information 231, probe information 232, video information 233, diagnosis result information 234, map information 235, and so on is accumulated in the storage device 230.

The in-vehicle device 200 is mounted to the vehicle that the user is driving (hereinafter termed "the subject vehicle"). It should be understood that a terminal device such as a smart phone, a car navigation system, a TCU (Telematics Control Unit) or the like may be employed as the in-vehicle device 200. Moreover, it would also be acceptable to constitute the in-vehicle device 200 by combining one or more of a stereo camera, a camera for capturing the interior of the subject vehicle, an overview camera for capturing the scene around the subject vehicle, a laser radar or a millimeter wave radar for measuring inter-vehicular distance, a biological information measurement device, or the like with these terminal devices.

The user information 231 is information related to the user who is using the in-vehicle device 200. User information 231 is recorded in each of the plurality of in-vehicle devices 200 that are connected to the telematics center 100 via the network 300, each of these items of user information 231 having different details.

The probe information 232 is information that has been acquired by the in-vehicle device 200 related to the operational state of the subject vehicle. The probe information 232 is read out from the storage device 230 at a predetermined timing by the probe information output unit 223, and is transmitted to the telematics center 100 by the communication unit 240 via the network 300.

The video information 233 is information including video that has been captured by the in-vehicle device 200. The video information 233 is read out from the storage device 230 at a predetermined timing by the video output unit 225, and is transmitted to the telematics center 100 by the communication unit 240 via the network 300.

The diagnosis result information 234 is information specifying result of driving characteristics diagnosis for the user who is using the in-vehicle device 200. In response to a request by the user, this diagnosis result information 234 is acquired from the telematics center 100, and is accumulated in the storage device 230.

The map information 235 is information specifying the positions of roads and their directions, shapes, and connection relationships, and traffic rules and so on.

The input/output device 201 is built as an input device for receiving operational input from the user and as an output device for outputting information of various types. For example, hardware switches such as operation buttons or the like, or a touch panel or the like, may be considered for the input device. Moreover, it would also be acceptable to implement the input device by employing gesture input in which specified gestures made by the user are detected and processing is performed corresponding to the gestures, or voice input in which the voice of the user is recognized and processing corresponding thereto is performed, or the like. And, for example, a display device such as an LCD that provides screen display, a speaker that outputs audio, light emitting equipment such as LEDs or the like, or a vibrator or the like may be considered for the output device. It should be understood that, for the input/output device 201, it would also be acceptable to provide the input device and the output device via separate terminal devices. For example, it would be possible to utilize a touch panel of a smart phone as the input device, and to utilize a display device or a speaker of a car navigation system that is mounted to the subject vehicle as the output device.

The acceleration measurement device 202 measures accelerations in various directions due to the behavior of the subject vehicle. For example, an acceleration sensor may be used as the acceleration measurement device 202.

The angular velocity measurement device 203 measures angular rotational speeds around various axes due to the behavior of the subject vehicle. For example, an angular velocity sensor may be used as the angular velocity measurement device 203.

The geomagnetism measurement device 204 measures the geomagnetisms in various directions, depending upon the azimuth of progression of the subject vehicle. For example, a geomagnetism sensor may be used as the geomagnetism measurement device 204.

The position measurement device 205 measures the position of the subject vehicle during its travel. For example, a GPS sensor may be used as the position measurement device 205. Moreover, it would also be acceptable to measure the position of the subject vehicle in its travel on the basis of information about a base station in the network 300 to which the in-vehicle device 200 is connected.

The camera 206 captures the view forward from the subject vehicle, and/or the user who is driving the subject vehicle. The video image captured by the camera 206 is outputted to the video capturing processing unit 224.

The microphone 207 detects voice uttered by the user and converts the voice to an audio signal.

The inter-vehicular distance measurement device 208 measures the inter-vehicular distance between the subject vehicle and another vehicle in front of the subject vehicle. For example, a laser radar, a millimeter wave radar, an infrared sensor, a stereo camera, a monocular camera or the like may be used as the inter-vehicular distance measurement device 208. Furthermore, it would also be acceptable to employ the camera 206 as the inter-vehicular distance measurement device 208. It should be understood that it would also be possible to estimate the inter-vehicular distance between the subject vehicle and the other vehicle in front of the subject vehicle on the basis of some frequency component of the accelerations measured by the acceleration measurement device 202, or the like.

The proximity measurement device 209 detects others exterior to the subject vehicle who is present in the vicinity of the subject vehicle, like other vehicle, a two-wheeled vehicle, such as a bicycle, a motorcycle or the like, or a pedestrian or the like (hereinafter simply termed "something"), and measures the distance from the subject vehicle to the others, the relative position of the others with respect to the subject vehicle, or the like. For example, a laser radar, a millimeter wave radar, an infrared sensor, a stereo camera, a monocular camera or the like may be used as the proximity measurement device 209. It should be understood that it is not necessary for the proximity measurement device 209 to be built from a single type of device; it would also be acceptable to arrange to build it by combining a plurality of devices. Moreover, it would also be acceptable to utilize the camera 206 as the proximity measurement device 209. Yet further, it would also be acceptable to arrange to integrate the inter-vehicular distance measurement device 208 with the proximity measurement device 209.

The vehicle information acquisition device 210 acquires vehicle information related to the state of the subject vehicle from the subject vehicle. As vehicle information, the vehicle information acquisition device 210 may, for example, acquire CAN (Controller Area Network) information via an OBD2 (On Board Diagnostics, 2nd Generation) port that is installed to the subject vehicle, or the like. For example, speed information, steering operation information, accelerator operating information, brake operating information, directional indicator operating information, engine rotational speed information, and so on may be included in the vehicle information that is acquired by the vehicle information acquisition device 210.

The gaze measurement device 211 measures data related to the eye-gaze of the user while he is driving the subject vehicle. As the data related to the eye-gaze of the user, for example, by using a camera that captures the interior of the vehicle, an infra-red radiation sensor, or the like, the gaze measurement device 211 may measure the direction of the face of the user, his eye-gaze direction, information relating to opening and closing of his eyelids, or the like. It should be understood that it would also be possible to employ an eye-glasses type device or the like as the gaze measurement device 211. Moreover, it would also be acceptable to employ the camera 206 as the gaze measurement device 211.

The biological information measurement device 212 measures biological information of the user who is driving the subject vehicle. As biological information, the biological information measurement device 212 may, for example, detect data related to the brain waves of the user, his heart rate, his blood pressure, his body temperature, his myoelectrical activity, his sweating, or the like.

The acceleration conversion processing unit 221 resolves the accelerations in various directions that are measured by the acceleration measurement device 202 into an acceleration of the subject vehicle in its direction of progression (i.e. in its longitudinal direction), an acceleration of the subject vehicle in its transverse direction, in other words in the horizontal direction orthogonal to its direction of progression, and an acceleration of the subject vehicle in the vertical direction. And the acceleration conversion processing unit 221 stores information specifying the orientation of the acceleration measurement device 202 in the state in which the in-vehicle device 200 has been mounted to the subject vehicle. On the basis of this information, the acceleration conversion processing unit 221 converts the accelerations in various directions that are measured by the acceleration measurement device 202 into accelerations of the subject vehicle in its progression direction, in its transverse direction, and in the vertical direction.

The probe information accumulation processing unit 222 generates probe information 232 on the basis of various types of information acquired by the in-vehicle device 200, and accumulates the probe information in the storage device 230. The probe information accumulation processing unit 222 is able to generate probe information 232 by using any appropriate selection of data and/or information that has been measured or acquired by any one of the input/output device 201, the acceleration measurement device 202, the angular velocity measurement device 203, the geomagnetism measurement device 204, the position measurement device 205, the camera 206, the microphone 207, the inter-vehicular distance measurement device 208, the proximity measurement device 209, the vehicle information acquisition device 210, the gaze measurement device 211, and/or the biological information measurement device 212 described above.

The probe information output unit 223 reads out user information 231 and probe information 232 accumulated in the storage device 230, and outputs them to the communication unit 240. And the communication unit 240 transmits the user information 231 and the probe information 232 that have been outputted from the probe information output unit 223 to the telematics center 100 via the network 300. At this time, it would be acceptable to arrange for the probe information 232 that has been transmitted to be deleted from the storage device 230, since there is never any need to transmit the probe information 232 for a second time once it has been transmitted. The probe information output unit 223 may output the probe information 232 to the communication unit 240 at fixed intervals, or at a predetermined timing such as the time point at which traveling of the subject vehicle ends, or the like. It should be understood that it is not necessary for all of the probe information 232 that has been accumulated in the storage device 230 to be transmitted at the same time; depending upon the contents and the details of the probe information 232, it would be acceptable to arrange to transmit different sections thereof at different timings.

The video capturing processing unit 224 creates video information 233 on the basis of the video images captured by the camera 206, and accumulates the video information in the storage device 230. For example, the video capturing processing unit 224 may create video information 233 by extracting video at fixed intervals, or by extracting video for predetermined intervals (for example, over a few seconds) before and after the user has performed dangerous driving. It should be understood that it would also be acceptable to arrange for it to be possible to select whether or not to create video information 233, according to a request from the user.

The video output unit 225 reads out user information 231 and video information 233 accumulated in the storage device 230, and outputs them to the communication unit 240. And the communication unit 240 transmits the user information 231 and the video information 233 that have been outputted from the video output unit 225 to the telematics center 100 via the network 300. At this time, it would be acceptable to arrange for the video information 233 that has been transmitted to be deleted from the storage device 230, since there is never any need to transmit the video information 233 for a second time once it has been transmitted. The video output unit 225 may output the video information 233 to the communication unit 240 at fixed intervals, or at predetermined timings such as after dangerous driving by the user has been detected, or the like.

The diagnosis result acquisition unit 226 acquires result of diagnosis of the driving characteristics of the user that have been transmitted from the telematics center 100 and have been received by the communication unit 240, and accumulates these diagnosis result in the storage device 230 as diagnosis result information 234. And, when a command is inputted from the user to the input/output device 201 to the effect that diagnosis result for driving characteristics are being requested, in response thereto, the diagnosis result acquisition unit 226 transmits this request for driving characteristics diagnosis result for that user to the telematics center 100, using the communication unit 240. At this time, by designating a time interval range or a location or the like, the user is able to designate conditions upon the driving characteristics diagnosis result that he has requested. By this request being received in the telematics center 100, as previously described, the appropriate diagnosis result for the driving characteristics for that user are outputted from the diagnosis result output unit 129, and are transmitted to the in-vehicle device 200 by the communication unit 140. By these diagnosis result being received by the communication unit 240, the diagnosis result acquisition unit 226 is able to acquire the result of diagnosis of the driving characteristics of the user.

The diagnosis result display processing unit 227 generates screen display data for the driving diagnosis result by performing a predetermined display control procedure on the basis of the diagnosis result information 234 accumulated in the storage device 230, and outputs this screen display data to the input/output device 201. And on the basis of the screen display data, as will be described hereinafter, the input/output device 201 is able to display a screen that presents the result of driving characteristics diagnosis for the user to him. It should be understood that it is desirable for the diagnosis result display processing unit 227 to perform processing in order to change over the contents of the screen displayed upon the input/output device 1 as appropriate, in response to a request from the user.

The driving characteristics diagnosis system according to the embodiment of the present invention has the fundamental structure explained above. It should be understood that there is no need for all of the structural elements shown in FIG. 1 necessarily to be included. It will be acceptable for some of the structural elements of the telematics center 100 and/or of the in-vehicle device 200 to be omitted as appropriate, according to the details that will be described hereinafter of the dangerous driving detection processing, of the dangerous driving cause estimation processing, and of the blame ratio calculation processing for dangerous driving of a user. Furthermore, it will also be acceptable to arrange for a portion of the information accumulated in the storage device 130 and/or the storage device 230 to be omitted as appropriate.

Figure 2:
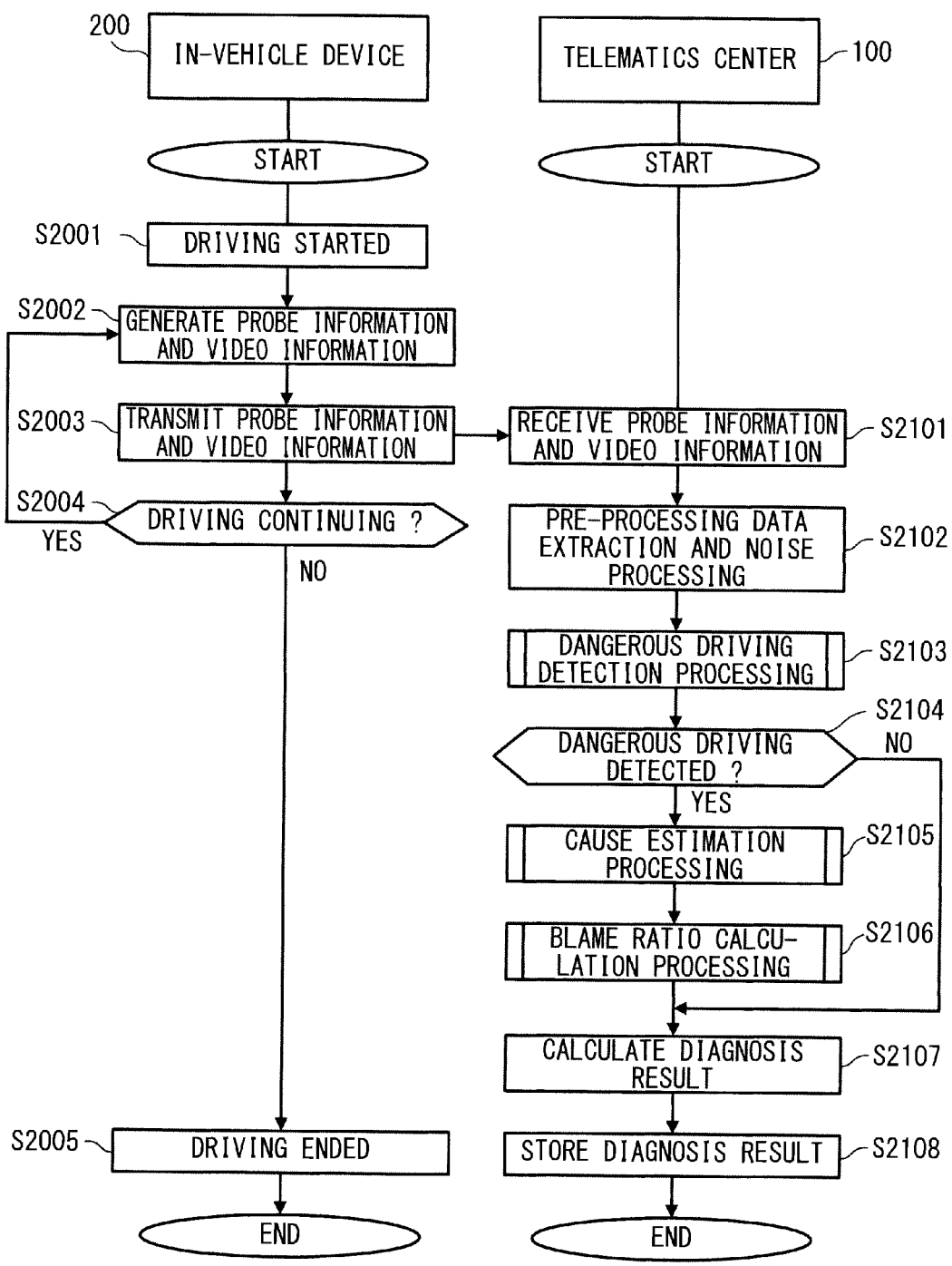
FIG. 2 is a flow chart showing a flow of processing for driving characteristics diagnosis, in a driving characteristics diagnosis system according to an embodiment of the present invention.

Next, the driving characteristics diagnosis processing performed by the present system will be explained. FIG. 2 is a flow chart showing the flow of driving characteristics diagnosis processing in the driving characteristics diagnosis system according to an embodiment of the present invention.

When a predetermined driving start condition is satisfied, in step S2001 the in-vehicle device 200 detects that driving of the subject vehicle has started. At this time, the in-vehicle device 200 may determine that the driving start condition is satisfied when, for example, the user performs a predetermined operation by using the input/output device 201, or when the subject vehicle has been started by operation of an ignition switch of the subject vehicle. Moreover, it would also be acceptable to arrange for the in-vehicle device 200 to determine that the driving start condition is satisfied when the moving distance of the subject vehicle has exceeded a predetermined threshold value (for example 50 m), or when the running speed of the subject vehicle has exceeded a predetermined threshold value (for example a speed of 15 km/h).

Then in step S2002 the in-vehicle device 200 generates probe information 232 and video information 233. At this time, the in-vehicle device 200 detects information of various kinds related to the operational state of the subject vehicle from the input/output device 201, the acceleration measurement device 202, the angular velocity measurement device 203, the geomagnetism measurement device 204, the position measurement device 205, the camera 206, the microphone 207, the inter-vehicular distance measurement device 208, the proximity measurement device 209, the vehicle information acquisition device 210, the gaze measurement device 211, and/or the biological information measurement device 212. And the probe information 232 is generated by the probe information accumulation unit 222 on the basis of this information that has been detected, and is accumulated in the storage device 230. Moreover, the in-vehicle device 200 generates video information 233 on the basis of the video image captured by the camera 206, and accumulates this video information in the storage device 230.

In step S2003 the in-vehicle device 200 transmits the probe information 232 and the video information 233 that have thus been accumulated in step S2002 in the storage device 230 to the telematics center 100. At this time, the in-vehicle device 200 reads out the probe information 232 from the storage device 230 and outputs it to the communication unit 240 with the probe information output unit 223, and reads out the video information 233 from the storage device 230 and outputs it to the communication unit 240 with the video output unit 225. And the communication unit 240 transmits the probe information 232 and the video information 233 that have been respectively inputted from the probe information output unit 223 and from the video output unit 225 to the telematics center 100 via the network 300. It should be understood that, as already described, this transmission of the probe information 232 and of the video information 233 may be performed at fixed time intervals, or may be performed at a predetermined timing. Furthermore, after the probe information 232 and the video information 233 have been generated in step S2002, it would be acceptable for the in-vehicle device 200 not to accumulate them in the storage device 230, but to output them directly to the communication unit 240, thus transmitting them to the telematics center 100.

Then in step S2004 the in-vehicle device 200 makes a decision as to whether or not driving of the subject vehicle is being continued. At this time, the in-vehicle device 200 may make this decision in step S2004 on the basis of a condition similar to the driving start condition that was used in step S2001. If the result is that driving of the subject vehicle is continuing, the in-vehicle device 200 returns the flow of control to step S2002 and the processing described above is repeated. On the other hand, if driving of the subject vehicle is not continuing, then the in-vehicle device 200 transfers control to step S2005 in which it is determined that driving has ended, and then the processing flow of FIG. 2 terminates.

In step S2101, the telematics center 100 receives the probe information 232 and the video information 233 that have been transmitted from the in-vehicle device 200 with the communication unit 140. The probe information 232 and the video information 233 that have been received are accumulated in the storage device 130 as probe information 132 and video information 133 by the probe information acquisition unit 121 and by the video information acquisition unit 122 respectively.

In step S2102, with the probe information pre-processing unit 124, the telematics center 100 performs predetermined pre-processing upon the probe information 132 that was received from the in-vehicle device 200 in step S2101 and has been accumulated in the storage device 130. At this time, as pre-processing, as previously described, the probe information pre-processing unit 124 performs processing in order to eliminate noise components due to vibration and so on, to extract probe information in the vicinity of an intersection, to determine the road classification for the traveling track of the subject vehicle, and so on. For example, it would be possible to eliminate noise components due to vibration from the acceleration information or from other information included in the probe information 132 by using a technique of low pass filtering or discrete wavelet conversion or the like. Moreover, it may also be contemplated to extract information from within the probe information 132 when, on its traveling track, the subject vehicle passes through the vicinity of an intersection, or to attach road classification information to the probe information 132 in consideration of the classification of the road along which the traveling track is passing. It should be understood that, according to requirements, it would also be acceptable to perform pre-processing, not only upon the probe information 132, but upon the video information 233 as well. Moreover it would also be possible, after having received the probe information 132 and the video information 233 in step S2101, to perform pre-processing upon them in step S2102 before accumulating them in the storage device 130.

Furthermore it would also be acceptable, in the pre-processing performed in step S2102, to arrange to delete unnecessary information from the probe information 132 and the video information 133 accumulated in the storage device 130. For example, it is not necessary to perform detection of dangerous driving and diagnosis of driving characteristics for probe information that has been acquired while the subject vehicle was stopping. For this purpose, the probe information pre-processing unit 124 deletes information in the probe information 132 corresponding to any period for which it has been determined that the subject vehicle was in stopping, thus eliminating this deleted information from the subjects for subsequent processing. At this time, for example, the probe information pre-processing unit 124 may specify the position of the subject vehicle on the basis of the probe information 132 at fixed time intervals, and may calculate the distance that the subject vehicle has moved by calculating the distance between each two consecutive ground points. And, if this moved distance is less than some predetermined threshold value, then it may be determined that the subject vehicle was in stopping during the corresponding interval. Moreover, apart from the above, it is also possible for the probe information pre-processing unit 124 to extract and delete various types of unnecessary information from the probe information 132 and the video information 133 by employing methods of various kinds.

In step S2103, with the dangerous driving detection processing unit 125, the telematics center 100 performs dangerous driving detection processing in order to detect dangerous driving by the user. The details of the processing that is performed at this time by the dangerous driving detection processing unit 125 will be described in concrete terms hereinafter with reference to the flow chart of FIG. 4. It should be understood that, when the dangerous driving detection processing unit 125 receives the probe information 232 and the video information 233 in step S2101, it may execute the dangerous driving detection processing corresponding thereto in real time. Or, for example, it would also be acceptable to arrange for the dangerous driving detection processing to be executed at a predetermined timing, as for example after driving of the subject vehicle has ended or the like. Yet further it would also be acceptable to arrange, when a request for driving characteristics diagnosis result is received from the in-vehicle device 200 in step S3101 of FIG. 3 as will be described hereinafter, for dangerous driving detection processing to be executed corresponding thereto.

In step S2104, on the basis of the result of the dangerous driving detection processing performed in step S2103, the telematics center 100 makes a decision as to whether or not dangerous driving has been detected by the dangerous driving detection processing unit 125. If dangerous driving of the subject vehicle by the user has been detected by this dangerous driving detection processing, then the flow of control proceeds to step S2105, whereas, if dangerous driving has not been detected, then the flow of control is transferred to step S2107.

In step S2105, with the cause estimation processing unit 126, the telematics center 100 performs cause estimation processing in order to estimate the cause of the dangerous driving that was detected in step S2103. The details of the processing that is performed by the cause estimation processing unit 126 at this time will be described in concrete terms hereinafter with reference to the flow charts of FIGS. 5 and 6.

In step S2106, with the blame ratio calculation unit 127, the telematics center 100 performs blame ratio calculation processing in order to calculate a blame ratio that is to be attributed to the user in regard to the dangerous driving that was detected in step S2103. The details of the processing that is performed by the blame ratio calculation unit 127 at this time will be described in concrete terms hereinafter with reference to the flow chart of FIG. 7.

In step S2107, with the driving characteristics diagnosis processing unit 128, the telematics center 100 calculates the result of diagnosis of driving characteristics for the user. At this time, the driving characteristics diagnosis processing unit 128 calculates result of diagnosis of driving characteristics for each of the users who possesses in-vehicle devices 200, on the basis of the result of detection of dangerous driving by step S2103, the cause of that dangerous driving that was estimated in step S2105, and the blame ratio for the users in the dangerous driving that was calculated in step S2106. It should be understood that it would also be acceptable to arrange to calculate diagnosis result for the driving characteristics of the user by executing step S2107, only if it has been decided that dangerous driving has been detected in step S2104.

In step S2108, the telematics center 100 accumulates the diagnosis result for driving characteristics calculated in step S2107 by the driving characteristics diagnosis processing unit 128 in the storage device 130. At this time, the driving characteristics diagnosis processing unit 128 accumulates information specifying the result of driving characteristics diagnosis in the storage device 130 as diagnosis result information 134. When the processing of step S2108 has been executed, the telematics center 100 terminates the processing flow of FIG. 2.

It should be understood that, in the flow chart of FIG. 2 explained above, it would also be acceptable for the telematics center 100 not to execute the blame ratio calculation processing of step S2106. In this case, in relation to the cause of the dangerous driving that was estimated in step S2105, it would be acceptable to arrange for the telematics center 100 to calculate an estimation probability for the cause in step S2107, and for the telematics center 100 to accumulate the estimation probability that has thus been calculated in the storage device 130 in step S2108. Or, it would also be possible only to estimate a cause for the dangerous driving, but not to calculate an estimation probability for that cause.

Figure 3:
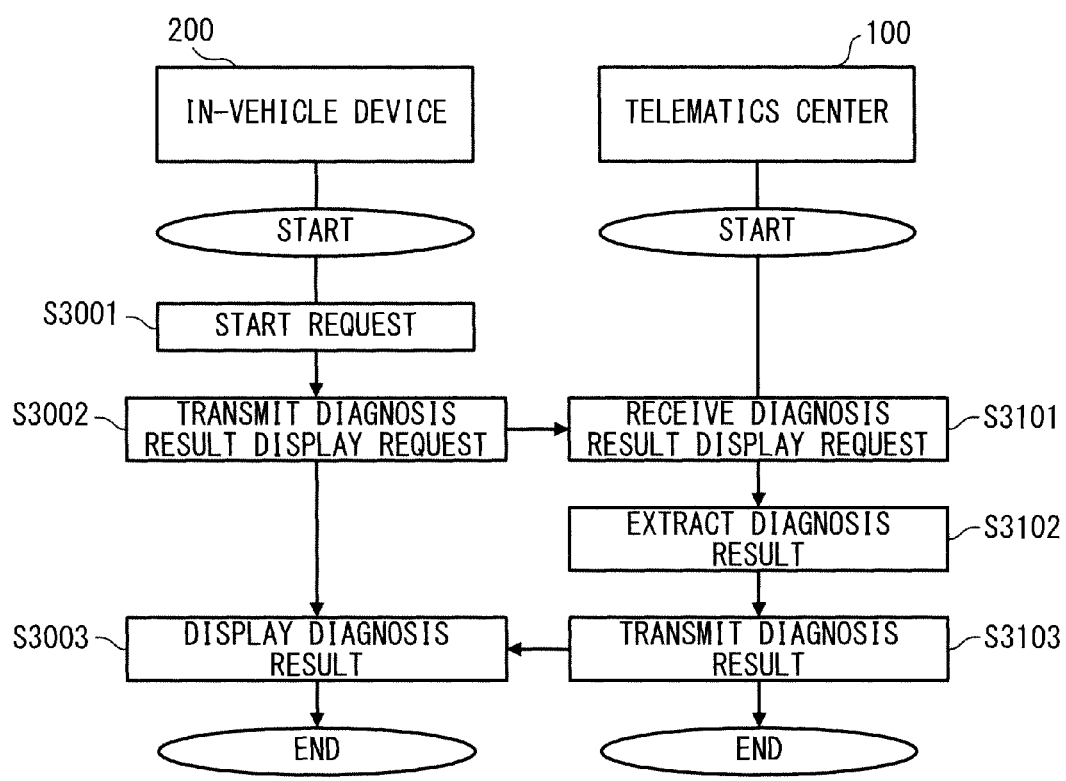
FIG. 3 is a flow chart showing a flow of processing for supplying the result of diagnosis, in a driving characteristics diagnosis system according to an embodiment of the present invention.

Next, the diagnosis result supply processing performed by the present system will be explained. FIG. 3 is a flow chart showing the flow of processing for supplying the result of diagnosis, in the driving characteristics diagnosis system according to an embodiment of the present invention.

When a predetermined request start condition is satisfied, in step S3001 the in-vehicle device 200 detects a start request from the user for diagnosis result of driving characteristics. At this time, the in-vehicle device 200 is able to determine that the request start condition is satisfied when, for example, the user has performed a predetermined operation by using the input/output device 201, or when driving of the subject vehicle has ended.

In step S3002 the in-vehicle device 200 transmits to the telematics center 100 a request for provision of diagnosis result of driving characteristics. At this time, as a request for diagnosis of the driving characteristics of the user, the in-vehicle device 200 transmits a predetermined request signal to the telematics center 100 with the diagnostics result acquisition unit 226 and the communication unit 240. This request signal includes request conditions specified by the user for the result of diagnosis of driving characteristics, information for specifying the user, and so on.

In step S3101, with the communication unit 140, the telematics center 100 receives the request signal that was transmitted from the in-vehicle device 200 in step S3002. The request signal that has been received is outputted from the communication unit 140 to the diagnosis result output unit 129.

In step S3102, with the diagnosis result output unit 129, the telematics center 100 extracts from the storage device 130 result of diagnosis corresponding to the user who requested the result of diagnosis of driving characteristics in step S3001. At this time, the telematics center 100 specifies the user on the basis of the request signal that was received in step S3101. And, among the diagnosis result information 134 accumulated in the storage device 130, the telematics center 100 extracts information corresponding to that user, according to the request condition specified by that user.

In step S3103, the telematics center 100 transmits the diagnosis result that were extracted in step S3102 to the in-vehicle device 200. At this time, the telematics center 100 outputs to the communication unit 140 information relating to the diagnosis result that have been extracted from the diagnosis result output unit 129, and transmits this information with the communication unit 140. When the processing of step S3103 has been executed, the telematics center 100 terminates the processing flow of FIG. 3.

In step S3003 the in-vehicle device 200 receives the diagnosis result for driving characteristics from the telematics center 100 with the communication unit 240, and displays those result upon the input/output device 201. At this time, the in-vehicle device 200 performs a predetermined display control processing with the diagnosis result display processing unit 227 on the basis of the information relating to the diagnosis result that has been received, so as to control the display screen of the input/output device 201. Due to this, diagnosis result for driving characteristics corresponding to the request that the user made in step S3001 are presented to the user. It should be understood that the concrete details of the method for display of the diagnosis result for driving characteristics upon the input/output device 201 at this time will be explained hereinafter. When the processing of step S3003 has been executed, the in-vehicle device 200 terminates the processing flow of FIG. 3.

It should be understood that it would also be acceptable, in the flow of diagnosis result supply processing shown in FIG. 3 explained above, to arrange for the in-vehicle device 200 to execute step S3002, and to transmit a request for provision of the result of diagnosis of driving characteristics to the telematics center 100, even if no start request from the user has been detected in step S3001. For example, it may be arranged for a request for provision of the result of diagnosis of driving characteristics to be issued to the telematics center 100 from the in-vehicle device 200 at some predetermined fixed interval, for example once a day, once a week, once a month, or the like. By doing this, it is possible to cause the telematics center 100 to perform diagnosis of driving characteristics for the user on the basis of information related to the operational state of that user that has been accumulated within the above interval, to cause the result to be outputted from the telematics center 100 to the in-vehicle device 200, and thereby to supply the result to the user. Furthermore, it would also be acceptable to arrange for the result of diagnosis of driving characteristics to be transmitted from the telematics center 100 to the in-vehicle device 200 even if no request signal has been transmitted from the in-vehicle device 200, for example if the telematics center 100 has detected dangerous driving.

Moreover, it would also be possible for the in-vehicle device 200 that executes the processing of steps S3001 through S3003 shown in the processing flow of FIG. 3, and the in-vehicle device 200 that executes the processing of steps S2001 through S2003 shown in the processing flow of FIG. 2, not to be the same device. For example, it would be possible to execute the processing of FIG. 3 by employing some other device that is connected to the network 300, such as a television, a notebook PC, a tablet PC, a smart phone, or the like, other than the device used for executing the processing of FIG. 2. Yet further, it would also be possible for the in-vehicle device 200 that transmits the request signal to the telematics center 100 in step S3002, and the in-vehicle device 200 that receives the diagnosis result for driving characteristics from the telematics center 100 in step S3003, not to be the same device. For example, after the user has transmitted a request signal from an in-vehicle device 200 that is mounted to the subject vehicle, such as a car navigation system, it would be possible to receive and to display the diagnosis result for driving characteristics by employing a television that is installed in the home of the user, or a PC or the like, instead of an in-vehicle device 200. In this case, it would not matter whether or not the terminal device 200 that is used for receiving and displaying the diagnosis result for driving characteristics is mounted to the subject vehicle.

Figure 4:
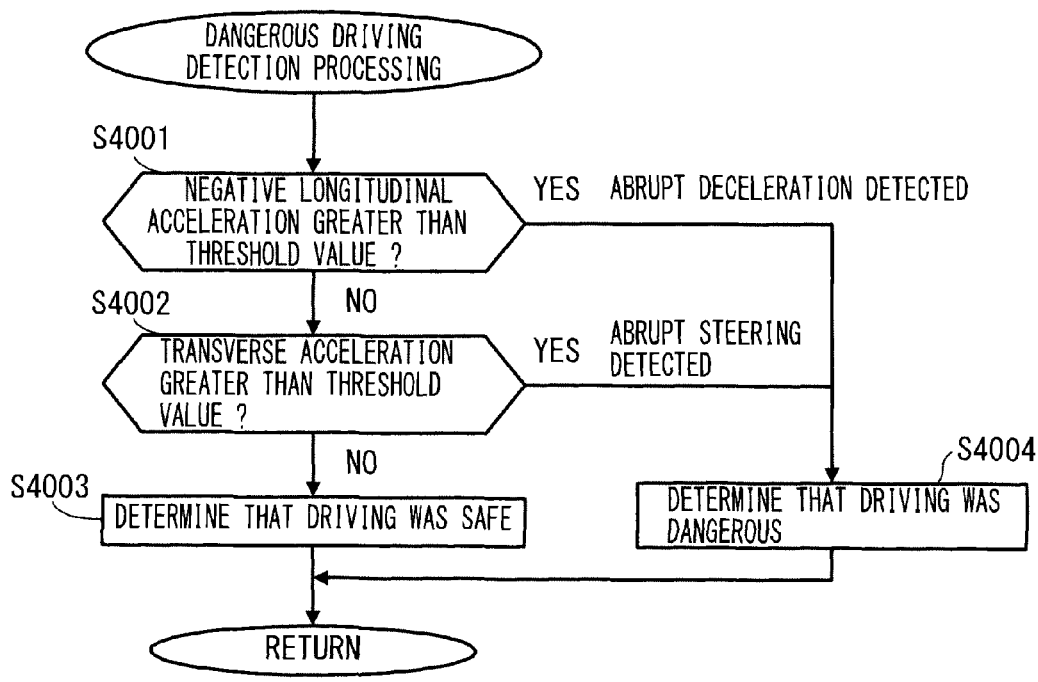
FIG. 4 is a flow chart showing a flow of processing for detection of dangerous driving.

Next, the dangerous driving detection processing performed in step S2103 of FIG. 2 will be explained. FIG. 4 is a flow chart showing the flow of the dangerous driving detection processing.

In step S4001, on the basis of the acceleration data for the subject vehicle that is included in the probe information 132, the dangerous driving detection processing unit 125 makes a decision as to whether or not any acceleration of the subject vehicle in its negative longitudinal direction has been greater than a predetermined threshold value (for example 0.5 m/s$^2$). If the acceleration of the subject vehicle in its negative longitudinal direction has been greater than the predetermined threshold value, in other words if the acceleration of the subject vehicle in the rearward direction has ever been greater than the predetermined threshold value, then it is decided that the user has abruptly decelerated or has abruptly stopped the subject vehicle and the flow of control is transferred to step S4004, whereas if this is not the case then the flow of control proceeds to step S4002.

In step S4002, on the basis of the acceleration data for the subject vehicle that is included in the probe information 132, the dangerous driving detection processing unit 125 makes a decision as to whether or not any acceleration of the subject vehicle in its transverse direction has been greater than a predetermined threshold value (for example 0.5 m/s$^2$). If the transverse acceleration has been greater than the threshold value, in other words if the acceleration of the subject vehicle in the transverse direction has ever been greater than the predetermined threshold value, then it is decided that the user has abruptly operated the steering of the subject vehicle and the flow of control is transferred to step S4004, whereas if this is not the case then the flow of control proceeds to step S4003.

In step S4003, the dangerous driving detection processing unit 125 detects that the user has been driving the subject vehicle safely. At this time, the telematics center 100 determines that the user has not performed dangerous driving such as abrupt deceleration, abrupt stopping, abrupt steering operation or the like, and accordingly it is determined that he has been driving safely. When step S4003 has been executed, the dangerous driving detection processing unit 125 outputs detection result showing that safe driving has been detected, and then the flow of control proceeds to step S2104 of FIG. 2. It should be understood that it would also be acceptable not to output detection result showing that driving has been safe, but rather to output detection result showing that dangerous driving has not yet been detected.

On the other hand, in step S4004, the dangerous driving detection processing unit 125 detects that the user has been driving the subject vehicle in a dangerous manner. At this time, the telematics center 100 determines that the user has performed dangerous driving such as abrupt deceleration, abrupt stopping, abrupt steering operation or the like. When this step S4004 has been executed, the dangerous driving detection processing unit 125 outputs detection result showing that dangerous driving has been detected, and then the flow of control proceeds to step S2104 of FIG. 2. It should be understood that, in addition to outputting the fact that dangerous driving has been detected, it would be possible also to output information specifying the type of dangerous driving.

Moreover, it should be understood that the dangerous driving detection processing shown in FIG. 4 could also be performed by the in-vehicle device 200, rather than by the dangerous driving detection processing unit 125 of the telematics center 100. In this case, the in-vehicle device 200 would perform the decision of S4001 and the decision of S4002 on the basis of the accelerations of the subject vehicle in its longitudinal direction and in its transverse direction as obtained by the acceleration conversion processing unit 221, and would transmit probe information 232 including information specifying the result of these decisions to the telematics center 100. And the telematics center 100 would acquire the result of these decisions by the in-vehicle device 200, based upon the probe information 132 accumulated in the storage device 130 on the basis of the probe information 232 received from the in-vehicle device 200. As a result, it is possible to determine whether the user has performed safe driving or has performed dangerous driving.

Figure 5:
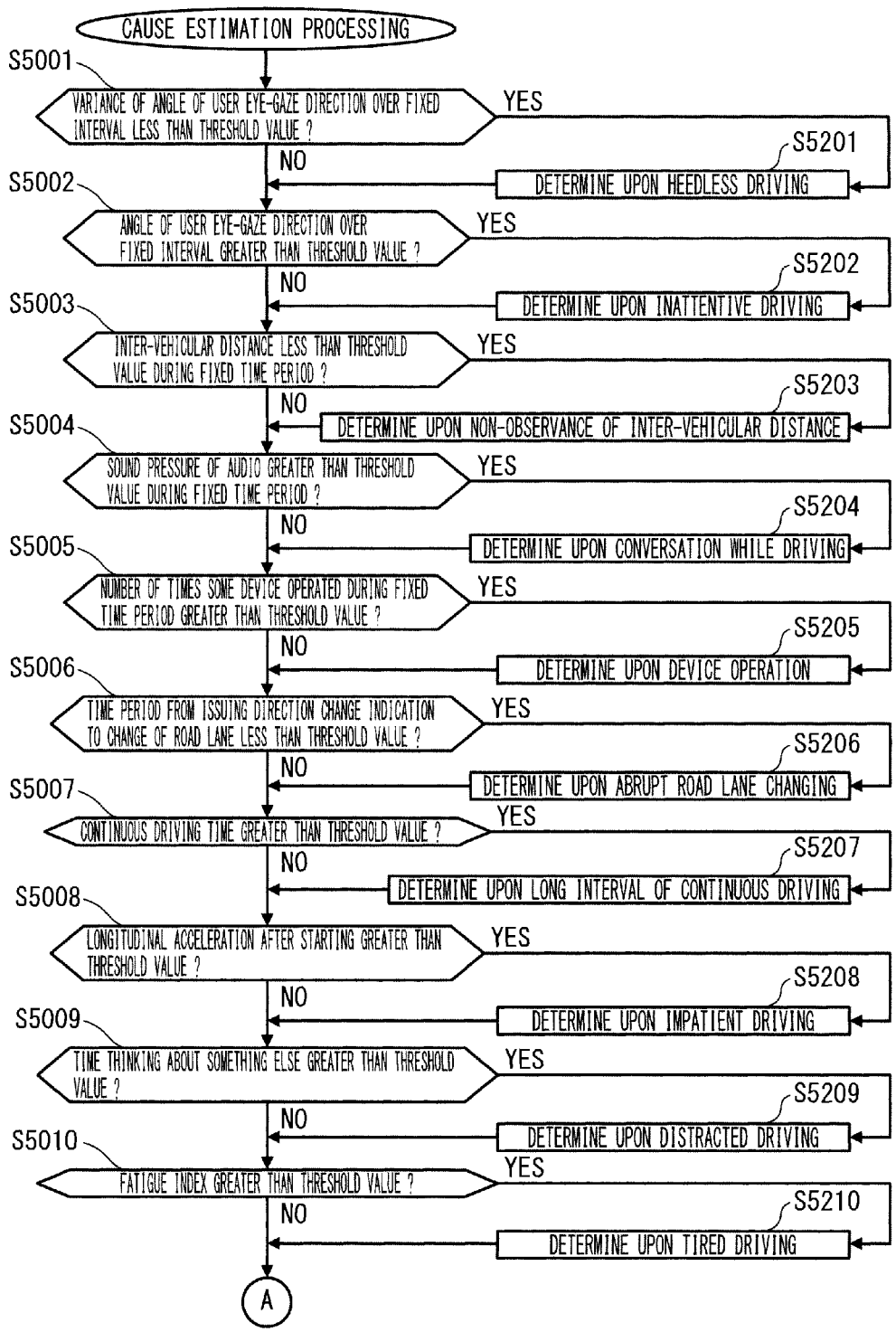
FIG. 5 is a first flow chart showing a flow of cause estimation processing.
Figure 6:
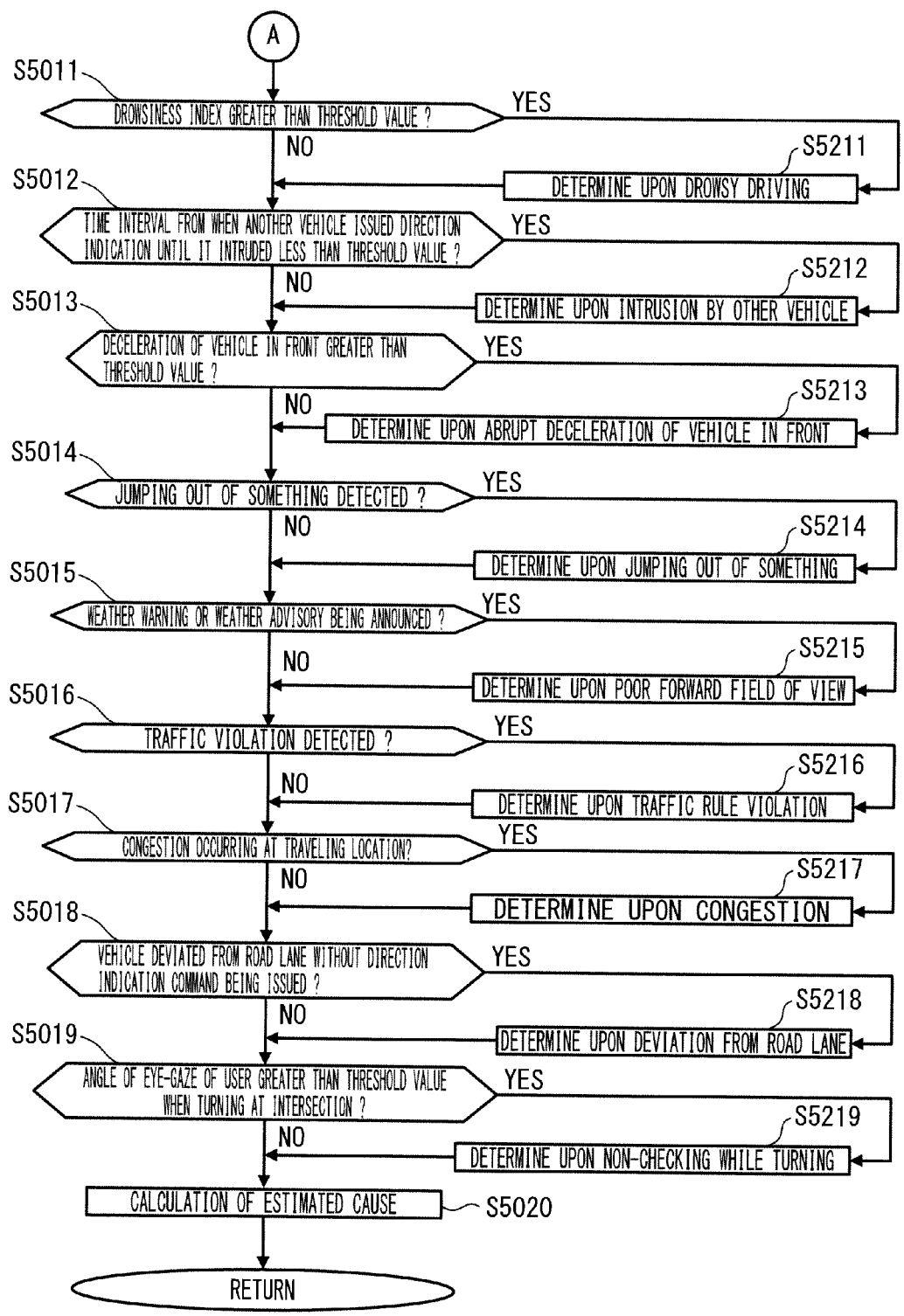
FIG. 6 is a flow chart showing a flow of cause estimation processing.

Next, the cause estimation processing performed in step S2105 of FIG. 2 will be explained. FIG. 5 and FIG. 6 are flow charts showing the flow of the cause estimation processing.

In steps S5001 and S5201, the cause estimation processing unit 126 performs processing in order to make a decision as to whether or not the user has performed heedless driving. In concrete terms, in step S5001, on the basis of data relating to eye-gaze of the user that is included in the probe information 132, the cause estimation processing unit 126 makes a decision as to whether or not the variance of the angle of the eye-gaze of the user over a fixed time period (for example, over three seconds) is less than a predetermined threshold value (for example, 0.3). If the result is that this variance is less than the threshold value, then it may be determined that the user has been performing heedless driving, and, after heedless driving has been detected upon in step S5201, the flow of control proceeds to step S5002. On the other hand, if this variance is greater than the threshold value, then the flow of control proceeds to step S5002 without step S5201 being executed. It should be understood that it would also be acceptable to perform the decision of step S5001 by employing the standard deviation of the angle of the eye-gaze of the user, or the like, instead of its variance.

In steps S5002 and S5202 the cause estimation processing unit 126 performs processing in order to make a decision as to whether or not the user has performed inattentive driving. In concrete terms, in step S5002, on the basis of data relating to the eye-gaze of the user that is included in the probe information 132, the cause estimation processing unit 126 makes a decision as to whether or not the interval during which the angle of the eye-gaze of the user has been greater than a predetermined threshold value (for example, 50°) has continued for more than a fixed time period (for example, three seconds). If the result is that it is decided that the interval during which the angle of the eye-gaze of the user has been greater than the predetermined threshold value has continued for more than the fixed time period, then it may be determined that the user has been performing inattentive driving, and, after inattentive driving has been detected upon in step S5202, the flow of control proceeds to step S5003. On the other hand, if this condition is not satisfied, then the flow of control proceeds to step S5003 without step S5202 being executed. It should be understood that it would also be acceptable to make the decision in step S5002, not by employing the eye-gaze, but by employing the direction of the face of the user which has been captured by the camera 206, or the like. Moreover, it would also be possible to determine that the user has performed inattentive driving when, during a fixed time period, the average value of the angle of the eye-gaze of the user has exceeded a threshold value. In this case, it is desirable not to detect inattentive driving when the subject vehicle is stopped, even if the decision condition in step S5002 is satisfied.

In steps S5003 and S5203, the cause estimation processing unit 126 performs processing in order to make a decision as to whether or not the inter-vehicular distance between the subject vehicle and some other vehicle in front of it has been appropriate. In concrete terms, in step S5003, on the basis of measurement data for inter-vehicular distance that is included in the probe information 132, the cause estimation processing unit 126 makes a decision as to whether or not the inter-vehicular distance between the subject vehicle and some other vehicle in front of it has been less than a predetermined threshold value (for example, 10 m). If the result is that it is decided that the inter-vehicular distance has been less than the threshold value, then it is determined that the inter-vehicular distance has not been appropriate, and, after inappropriate inter-vehicular distance has been detected upon in step S5203, the flow of control then proceeds to step S5004. On the other hand, if the inter-vehicular distance has is greater than the threshold value, then it is determined that the inter-vehicular distance has been appropriate, and the flow of control proceeds to step S5004 without step S5203 being executed. At this time, it would also be acceptable to perform the decision of step S5203 by using measurement data for the inter-vehicular distance at the time point that dangerous driving was detected in the dangerous driving detection processing explained in connection with FIG. 4, or at a time point just before that time point. Moreover, it would also be possible to determine that the inter-vehicular distance has not been appropriately observed if, over a fixed time period (for example, three seconds), the average value of the inter-vehicular distance has been less than a threshold value.

In steps S5004 and S5204, the cause estimation processing unit 126 performs processing in order to make a decision as to whether or not the user has been conversing while driving. In concrete terms, in step S5004, on the basis of measurement data for audio sound pressure at the microphone 207 that is included in the probe information 132, the cause estimation processing unit 126 makes a decision as to whether or not the sound pressure of the voice of the user has been greater than a predetermined threshold value (for example 50 decibels). If the result is that the sound pressure has been greater than the threshold value, then it is determined that the user has been conversing while driving, and, after driving while conversing has been detected upon in step S5204, the flow of control then proceeds to step S5005. On the other hand, if the sound pressure has always been less than the threshold value, then it is determined that the user has not been conversing while driving, and the flow of control proceeds to step S5005 without step S5204 being executed. At this time, when measuring the sound pressure of the voice at the microphone 207, it is desirable to perform processing to eliminate all sounds other than the user's voice. Moreover, it would also be possible to determine that the user has been conversing while driving when, over a fixed time period (for example, five seconds), the sound pressure of the voice that has been measured has become greater than a threshold value.

In steps S5005 and S5205, the cause estimation processing unit 126 performs processing in order to make a decision as to whether or not the user has operated a device within the subject vehicle while driving. In concrete terms, in step S5005, on the basis of operating information for the input output/device 201 or vehicle information that is included in the probe information 132, the cause estimation processing unit 126 makes a decision as to whether or not, within a fixed time period (for example, 5 seconds), the user has operated any device such as a button or the like that is mounted to the subject vehicle more often than a predetermined threshold number of times (for example, five times). If the result is that number of times of operation has been greater than the threshold value, then it is determined that the user has operated a device dangerously while driving, and, after operation of a device has been detected upon in step S5205, the flow of control then proceeds to step S5006. On the other hand, if the number of times of operation of a device has been less than the threshold value, then it is determined that the user has not operated a device dangerously while driving, and the flow of control proceeds to step S5006 without step S5205 being executed.

In steps S5006 and S5206, the cause estimation processing unit 126 performs processing in order to make a decision as to whether or not the user has abruptly changed the subject vehicle from one road lane to another. In concrete terms, in step S5006, on the basis of steering operation information and directional indicator operation specified by vehicle information that is included in the probe information 132, the cause estimation processing unit 126 makes a decision as to whether or not the time interval from when the user issued a directional indication command until he actually changed road lanes has been less than a predetermined threshold value (for example 3 seconds).

If the result is that the time interval for lane changing has been less than the threshold value, then it is determined that the user has abruptly changed the subject vehicle from one road lane to another, and, after abrupt lane changing has been detected upon in step S5206, the flow of control then proceeds to step S5007. On the other hand, if the time period for lane changing has been greater than the threshold value, then it is determined that the user has not performed abrupt lane changing, and the flow of control proceeds to step S5007 without step S5206 being executed. At this time, it would also be acceptable to arrange to determine whether or not the user has changed the subject vehicle from one road lane to another on the basis of the steering angle that is given by the steering operation information, or the positions of road marking lines as detected from the images that have been captured forward from the subject vehicle by the camera 206, or acceleration data for the subject vehicle that are included in the probe information 132, or the like.

In steps S5007 and S5207, the cause estimation processing unit 126 performs processing in order to make a decision as to whether or not the user has been driving for a long continuous time period. In concrete terms, in step S5007, the cause estimation processing unit 126 makes a decision as to whether or not the time period that the user has been driving continuously is greater than a predetermined threshold value (for example two hours). If the result is that the time period of continuous driving has been greater than the threshold value, then it is determined that the user has been driving for a long time, and, after having detected upon driving for a long time in step S5207, the flow of control then proceeds to step S5008. On the other hand, if the time period of continuous driving is less than the threshold value, then it is determined that the user has not been driving for a long time, and the flow of control proceeds to step S5008 without step S5207 being executed. It should be understood that it is desirable for the in-vehicle device 200 to transmit, included in the probe information 132, information specifying the time point that driving starting was detected in step S2001 of FIG. 2, and information specifying the elapsed time from the start of driving. The cause estimation processing unit 126 is able to obtain the time period over which the user has been performing continuous driving on the basis of this information.

In steps S5008 and S5208, the cause estimation processing unit 126 performs processing in order to make a decision as to whether or not the user has performed impatient driving. In concrete terms, in step S5008, on the basis of acceleration data for the subject vehicle that is included in the probe information 132, the cause estimation processing unit 126 determines that the subject vehicle has started off from the stopped state when, after the state in which the variance over a fixed time period (for example, three seconds) of the acceleration of the subject vehicle in its longitudinal direction has been less than a predetermined threshold value (for example, 0.3), that variance has exceeded that threshold value. And the cause estimation processing unit 126 makes a decision as to whether or not, at this time, the acceleration is greater than another predetermined threshold value (for example 0.7 m/sec$^2$). If the result is that the acceleration of the subject vehicle in its longitudinal direction has been greater than this other threshold value, then it is determined that the user has performed impatient driving, and, after impatient driving has been detected upon in step S5208, the flow of control then proceeds to step S5009. On the other hand, if the subject vehicle has not started off from the stopped state, or if, although it has started off, its acceleration in its longitudinal direction is less than the threshold value, then it is determined that the user has not performed impatient driving, and the flow of control proceeds to step S5009 without step S5208 being executed.

In steps S5009 and S5209, the cause estimation processing unit 126 performs processing in order to make a decision as to whether or not the user has performed distracted driving. In concrete terms, in step S5009, on the basis of measurement data for biological information about the user such as his brain waves and his surface myoelectric potential and so on included in the probe information 132, the cause estimation processing unit 126 makes a decision as to whether or not the user has been thinking about something extraneous to the vehicle; and, if the user has been thinking about something, then a further decision is made as to whether or not the interval over which he has been thinking is greater than a predetermined threshold value (for example, thirty seconds). If the result is that the user has been thinking about something over an interval that is greater than the threshold value, then it is decided that the user has been performing distracted driving during which his force of concentration upon the act of driving has deteriorated, and, after distracted driving has been detected upon in step S5209, the flow of control then proceeds to step S5010. On the other hand, if the user has not been thinking about something, or if the time interval over which he has been thinking has been less than the threshold value, then it is determined that the user has not performed distracted driving, and the flow of control proceeds to step S5010 without step S5209 being executed. Since the differences in the characteristics of biological information between individual people are rather large, it should be understood that, when determining whether or not the user has been distracted, it is desirable to use a threshold value that has been set on the basis of biological information for the particular user that has been measured in advance in states of various kinds. Or, it would also be possible to estimate whether or not the user is thinking about something by employing a technique such as machine learning or the like.

In steps S5010 and S5210, the cause estimation processing unit 126 performs processing in order to make a decision as to whether or not the user is tired. In concrete terms, in step S5010, on the basis of measurement data for biological information about the user such as his brain waves, his pulse, his surface myoelectric potential and so on, and the activity level of the user that is obtained from his eyelid opening and closing information and his eye-gaze information that are included in the probe information 132 and so on, the cause estimation processing unit 126 obtains the fatigue index of the user, and makes a decision as to whether or not this fatigue index is greater than a predetermined threshold value. If the result is that the fatigue index of the user is greater than the threshold value, then it is determined that the user is seriously fatigued, and, after tired driving has been detected upon in step S5210, the flow of control then proceeds to step S5011. On the other hand, if the fatigue index of the user is less than the threshold value, then it is determined that the tiredness of the user is within the permitted range, and the flow of control proceeds to step S5011 without step S5210 being executed. In a similar manner to the case for step S5009, it should be understood that, since the differences in the characteristics of biological information between individual people are rather large, when obtaining the fatigue index of the user, it is desirable to use a correspondence relationship between the values of biological information and the fatigue index that has been determined in advance for the particular user. Or, it would also be possible to obtain the fatigue index of the user by employing a technique such as machine learning or the like.

In steps S5011 and S5211, the cause estimation processing unit 126 performs processing in order to make a decision as to whether or not the user is performing drowsy driving. In concrete terms, in step S5011, on the basis of the activity level of the user that is obtained from his eyelid opening and closing information and his eye-gaze information and so on that are included in the probe information 132, the cause estimation processing unit 126 obtains a drowsiness index for the user, and makes a decision as to whether or not this drowsiness index is greater than a predetermined threshold value. If the result is that the drowsiness index is greater than the threshold value, then it is determined that the user is currently performing drowsy driving or is in a state directly before arriving at drowsy driving and, after drowsy driving has been detected upon in step S5211, the flow of control then proceeds to step S5012. On the other hand, if the drowsiness index of the user is less than the threshold value, then it is determined that the user is not performing drowsy driving, and the flow of control proceeds to step S5012 without step S5211 being executed. It should be understood that it would also be possible to obtain the drowsiness index of the user on the basis of his biological information such as his brain waves or the like, or on the basis of the appearance of the face of the user or the like, which may be detected from the images captured by the camera 206.

In steps S5012 and S5212, the cause estimation processing unit 126 performs processing in order to make a decision as to whether or not some other vehicle has unreasonably intruded in front of the subject vehicle. In concrete terms, in step S5012, the cause estimation processing unit 126 determines whether or not some other vehicle has intruded in front of the subject vehicle on the basis of the result of other vehicle detection by the proximity measurement device 209 included in the probe information 132, or on the basis of images captured forward from the subject vehicle by the camera 206. If the result is that some other vehicle has intruded in front of the subject vehicle, then the time period from when the other vehicle made a directional change indication until it performed this intrusion is obtained, and a decision is made as to whether or not this value was less than a predetermined threshold value for the interval (for example, one second). If the result is that this time period until intrusion was less than the threshold value, then it is determined that the other vehicle intruded unreasonably, and, after detecting unreasonable intrusion by another vehicle in step S5212, the flow of control then proceeds to step S5013. On the other hand, if no other vehicle has intruded in front of the subject vehicle, or if the time period until from signaling until intrusion was greater than the threshold value, then it is determined that no vehicle intruded unreasonably in front of the subject vehicle, and the flow of control proceeds to step S5013 without step S5212 being executed. It should be understood that it would also be acceptable to determine the way in which the subject vehicle and the other vehicle approached one another on the basis of the inter-vehicular distance from the subject vehicle to the other vehicle, and to vary the threshold value that is employed in the decision of step S5012 according thereto.

In steps S5013 and S5213, the cause estimation processing unit 126 performs processing in order to make a decision as to whether or not some other vehicle has decelerated abruptly in front of the subject vehicle. In concrete terms, in step S5013, on the basis of measurement data for inter-vehicular distance, the captured images that have been captured by the camera 206 forward from the subject vehicle, the running speed that has been obtained from the position information for the subject vehicle, or the like included in the probe information 132, the cause estimation processing unit 126 obtains the level of deceleration of another vehicle that is traveling in front of the subject vehicle (i.e. of the vehicle in front), and makes a decision as to whether or not the value of this deceleration is greater than a predetermined threshold value (for example 0.5 m/s$^2$). If the result is that the value of the deceleration of the vehicle in front is greater than the threshold value, then it is determined that the vehicle in front has decelerated abruptly, and, after abrupt deceleration of the vehicle in front has been detected upon in step S5213, the flow of control then proceeds to step S5014. On the other hand, if the level of the deceleration of the vehicle in front is less than the threshold value, then it is determined that the vehicle in front has not decelerated abruptly, and the flow of control proceeds to step S5014 without step S5213 being executed. It should be understood that it would also be acceptable to vary the threshold value that is used in the decision of step S5013 according to the inter-vehicular distance from the subject vehicle to the vehicle in front, or the like.

In steps S5014 and S5214, the cause estimation processing unit 126 performs processing in order to make a decision as to whether or not something has jumped out in front of the subject vehicle. In concrete terms, in step S5014, on the basis of the result of detection of something by the proximity measurement device 209 or on the basis of captured images forward from the subject vehicle captured by the camera 206 included in the probe information 132, the cause estimation processing unit 126 makes a decision as to whether or not something has suddenly appeared in front of the subject vehicle. If the result is that something has suddenly appeared in front of the subject vehicle, then the time period from when that something was recognized until he or she suddenly appeared in front of the subject vehicle is obtained, and a decision is made as to whether or not the value thereof is less than a predetermined threshold value (for example, three seconds). If the result is that the period until the sudden appearance of that something was less than the threshold value, then it is determined that the something jumped out dangerously in front of the subject vehicle, and, after jumping out of that something has been detected upon in step S5214, the flow of control then proceeds to step S5015. On the other hand, if nothing else has jumped out in front of the subject vehicle, or if the time period until such a person suddenly appeared is greater than the threshold value, then it is determined that nothing else jumped out in front of the subject vehicle, and the flow of control proceeds to step S5015 without step S5214 being executed. It should be understood that it would also be acceptable to obtain the speed of movement of the something, and to make the decision in step S5014 on the basis of that speed of movement.

In steps S5015 and S5215, the cause estimation processing unit 126 performs processing in order to make a decision as to whether or not the field of view forward of the subject vehicle is poor. In concrete terms, in step S5015, on the basis of measurement data for the traveling position of the subject vehicle and environmental information that has been acquired by the environmental information acquisition unit and so on that is included in the probe information 132, the cause estimation processing unit 126 makes a decision as to whether or not a weather warning or a weather advisory is being announced for the region in the vicinity of the ground point at which the subject vehicle is traveling. If the result is that such a weather warning or a weather advisory is indeed being announced, then it is determined that the field of view forward of the subject vehicle is poor, and, after a poor forward field of view has been detected upon in step S5215, the flow of control then proceeds to step S5016. On the other hand, if no weather warning or weather advisory is being announced, then it is determined that the field of view forward of the subject vehicle is satisfactory, and the flow of control proceeds to step S5016 without step S5215 being executed. It should be understood that it would also be acceptable to arrange to determine whether or not the field of view forward from the subject vehicle is poor on the basis of the result of detection by the proximity measurement device 209 included in the probe information 132, or on the basis of images captured forward from the subject vehicle by the camera 206.

In steps S5016 and S5216, the cause estimation processing unit 126 performs processing in order to make a decision as to whether or not the user has committed a traffic violation. In concrete terms, in step S5016, on the basis of measurement data for position of the subject vehicle that is included in the probe information 132, environmental information which has been acquired by the environmental information acquisition unit 123, the map information 135, and so on, the cause estimation processing unit 126 acquires traffic regulation information as to the speed limit along the traveling track of the subject vehicle and whether the road being traveled upon is a one-way road and so on, and, on the basis thereof, makes a decision as to whether or not the running state of the subject vehicle is one that obeys these traffic regulations. If the result is that the traffic regulations have not been obeyed, then it is determined that the user has committed a traffic violation, and, after violation of the traffic laws has been detected upon in step S5216, the flow of control then proceeds to step S5017. On the other hand, if the traffic laws have been obeyed, then it is determined that no traffic violation has been performed, and the flow of control proceeds to step S5017 without step S5216 being executed.

In steps S5017 and S5217, the cause estimation processing unit 126 performs processing in order to make a decision as to whether or not a state of congestion is prevailing at the ground point at which the subject vehicle is traveling. In concrete terms, in step S5017, on the basis of measurement data for position of the subject vehicle and environmental information that has been acquired by the environmental information acquisition unit 123 and so on that is included in the probe information 132, the cause estimation processing unit 126 acquires congestion information for the traveling track of the subject vehicle, and, on the basis thereof, makes a decision as to whether or not congestion is prevailing at the ground point at which the subject vehicle is traveling. If the result is that there is congestion at the ground point at which the subject vehicle is traveling, then, after congestion at the ground point of the subject vehicle has been detected upon in step S5217, the flow of control proceeds to step S5018. On the other hand, if there is no congestion at the ground point at which the subject vehicle is traveling, then the flow of control proceeds to step S5018 without step S5217 being executed. Moreover, it should be understood that it would also be possible to arrange to decide whether or not there is congestion at the ground point at which the subject vehicle is traveling, on the basis of captured images forward from the vehicle captured by the camera 206, and of comparison between the speed limit on the traveling track of the subject of the vehicle as given by the map information 135 and the running speed of the subject vehicle, and so on.

In steps S5018 and S5218, the cause estimation processing unit 126 performs processing in order to make a decision as to whether or not the subject vehicle has deviated from its road lane without the user having intended to do so. In concrete terms, in step S5018, on the basis of directional indicator operation information specified in the vehicle information or on the basis of the images forward from the vehicle captured by the camera 206 or the like included in the probe information 132, the cause estimation processing unit 126 makes a decision as to whether or not the subject vehicle has deviated from its road lane without any direction indication signal having been issued by the user. If the result is that the subject vehicle has deviated from its road lane without the user having issued any direction indication signal, then it is determined that deviation of the subject vehicle from its road lane contrary to the intention of the user has occurred, and, after having detected upon deviation of the subject vehicle from its road lane in step S5218, the flow of control then proceeds to step S5019. On the other hand, if the subject vehicle has not deviated from its road lane, or if the subject vehicle has deviated from its road lane after the user has issued a directional indication command, then the flow of control proceeds to step S5019 without step S5218 being executed.

In steps S5019 and S5219, the cause estimation processing unit 126 performs processing in order to make a decision as to whether or not the user has performed checking while turning. In concrete terms, in step S5019, on the basis of measurement data for the travelling position of the subject vehicle included in the probe information 132 and on the basis of the eye-gaze information for the user, the cause estimation processing unit 126 obtains the angle of the eye-gaze of the user when the subject vehicle has turned left or right at an intersection, and makes a decision as to whether or not this angle was less than a predetermined threshold value (for example 50°). If the result is that the angle of the eye-gaze of the user has been less than the threshold value, then it is determined that the user did not perform checking for turning correctly when the subject vehicle turned at the intersection, and after non-checking when turning has been detected upon in step S5219, the flow of control then proceeds to step S5020. On the other hand, if the angle of the eye-gaze of the user has been greater than the threshold value, then it is determined that the user did perform turning checking correctly, and the flow of control proceeds to step S5020 without step S5219 being executed. It should be understood that it would also be possible to perform the decision in step S5019 by making a decision as to whether or not the state in which the angle of the eye-gaze of the user was greater than a threshold value before turning at the intersection continued for less than a predetermined time period (for example, two seconds). Moreover, when the driving is checking for turning, it may also be considered whether he looks carefully at the rear mirror, the side mirrors, and any blind spot portions toward the side of the subject vehicle. For this consideration, it is also possible to make the decision in step S5019 by determining whether or not the user has paid careful attention to these matters as well. In this case, it would be possible to arrange to determine whether or not the user is making careful observation by using machine learning or a statistical technique or the like.

By executing the processing of steps S5001 through S5019 and the processing of steps S5201 through S5219 explained above, the cause estimation processing unit 126 is able to detect dangerous driving factors of various types that can be the cause of dangerous driving. It should be understood that processing steps S5001 through S5011 and steps S5016, S5018, and S5019, and processing steps S5201 through S5211 and steps S5216, S5218, and S5219 corresponding respectively thereto, are decision processing steps for determining upon a presence or absence of dangerous driving factors that originate in the user. On the other hand, processing steps S5012 through S5015 and S5017, and processing steps S5212 through S5215 and S5217 respectively corresponding thereto, are decision processing steps for determining upon a presence or absence of dangerous driving factors that originate in causes external to the user.

In step S5020, the cause estimation processing unit 126 calculates an estimated cause for dangerous driving on the basis of the result of detection by steps S5201 through S5219. In other words, it obtains the dangerous driving factors detected corresponding to the processing executed among steps S5201 through S5219 as being the estimated cause of dangerous driving. When step S5020 has been executed the cause estimation processing unit 126 outputs the estimated cause of dangerous driving, and then the flow of control returns to step S2106 of FIG. 2.

It should be understood that the processing of steps S5001 through S5019 and S5201 through S5219 described above could also be performed by the in-vehicle device 200, rather than by the cause estimation processing unit 126 of the telematics center 100. For example, the in-vehicle device 200 could perform the processing of steps S5018 and S5218 by detecting deviation from the road lane on the basis of the images forward from the subject vehicle captured by the camera 206, and could transmit information specifying the result as included in the probe information 232. And the telematics center 100 could acquire the result of decision by the in-vehicle device 200 on the basis of the probe information 132 that is accumulated in the storage device 130 based upon the probe information 232 received from the in-vehicle device 200. By doing this, it would be possible to determine whether or not the subject vehicle has deviated from its road lane when the user has not intended to do so. Moreover, the in-vehicle device 200 could perform the processing of steps S5019 and S5219 by detecting the angle of the eye-gaze of the user when it is determined on the basis of the images forward from the subject vehicle captured by the camera 206 that the subject vehicle is turning at an intersection, and could transmit information specifying the result as included in the probe information 232. And the telematics center 100 could acquire the result of decision by the in-vehicle device 200 on the basis of the probe information 132 that is accumulated in the storage device 130 based upon the probe information 232 received from the in-vehicle device 200. By doing this, it would be possible to determine whether or not the user has checked when turning at the intersection. Apart from the above, it would be possible for the processing of any desired ones of steps S5001 through S5019 and corresponding steps S5201 through S5219 to be performed by the in-vehicle device 200.

Furthermore, the cause estimation processing unit 126 could also detect dangerous driving factors of various other types that could be the cause of dangerous driving, apart from those explained in FIG. 5 and FIG. 6. In other words, it would be possible for the cause estimation processing unit 126 to enhance the accuracy of estimation of the causes of dangerous driving by adding any desired dangerous driving factors, and by performing cause estimation processing in connection with those factors. Moreover, there is no need necessarily to detect all of the various dangerous driving factors explained in FIG. 5 and FIG. 6. According to the types of sensors that are mounted to the in-vehicle device 200 and according to the desired accuracy for the diagnosis of driving characteristics, it would be possible for the cause estimation processing unit 126 to perform cause estimation processing in order to detect any desired combination of dangerous driving factors.

Figure 7:
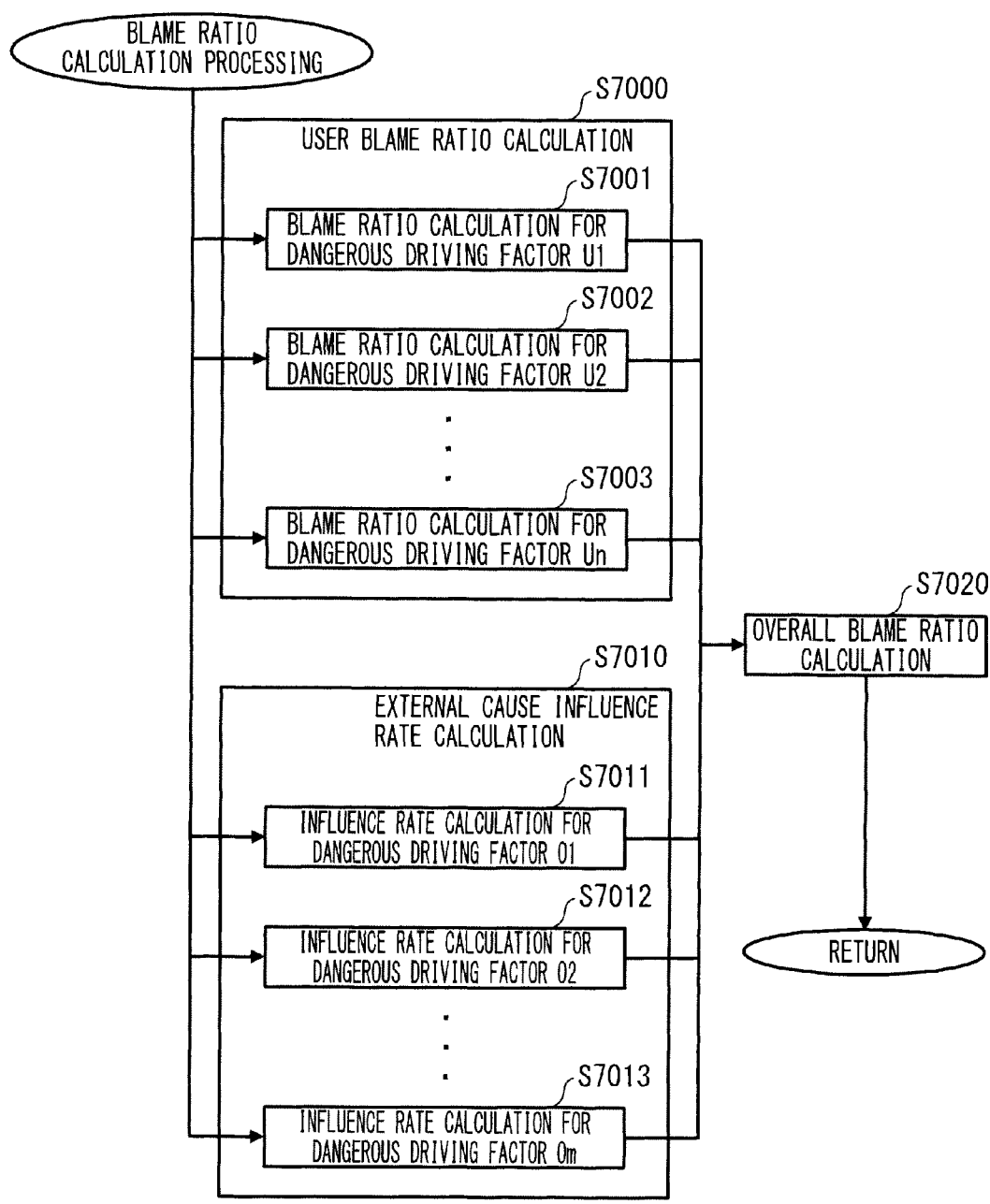
FIG. 7 is a flow chart showing a flow of processing for blame ratio calculation.

Next, the blame ratio calculation processing performed in step S2106 of FIG. 2 will be explained. FIG. 7 is a flow chart showing the flow of this blame ratio calculation processing.

In step S7000, among the dangerous driving factors that were detected in the previously described cause estimation processing, the blame ratio calculation unit 127 calculates a blame ratio for the user in relation to each of the dangerous driving factors that originate in the user. In concrete terms, the blame ratio for the user for each of the dangerous driving factors is calculated by performing the processing of steps S7001, S7002, and S7003 for dangerous driving factors U1, U2, Un respectively. Here, U1, U2, Un denote various dangerous driving factors originating in the user, in other words they represent any factors among the dangerous driving factors that have been subjects of detection by steps S5201 through S5210 of FIG. 5 and steps S5211, S5216, S5218, and S5219 of FIG. 6. Moreover, n represents any natural number, and is set to correspond to the number of dangerous driving factors originating in the user that are to be subjects of processing by this step S7000. It should be understood that, in the processing of step S7000, the blame ratio calculation unit 127 calculates a zero of blame ratio of the user for each dangerous driving factor that has not been detected by the cause estimation processing unit 126. Specific examples of the processing performed in steps S7001 through S7003 will be explained subsequently with reference to FIG. 8.

In step S7010, for those dangerous driving factors, among the dangerous driving factors detected by the cause estimation processing described above, that originate in causes external to the user, the blame ratio calculation unit 127 calculates an influence rate due to each cause. In concrete terms, by performing the processing of each of steps S7011, S7012, and S7013 for dangerous driving factors O1, O2, . . . Om, the influence rate of each external cause upon each of the dangerous driving factors is calculated. Here, O1, O2, . . . Om denote dangerous driving factors that originate in external causes; in other words, they represent any ones among the dangerous driving factors that have been the respective subjects of detection in steps S5212 through S5215 and S5217 of FIG. 6. Moreover, m represents any natural number, and is set to correspond to the number of dangerous driving factors originating in external causes that are to be subjects of processing by this step S7010. It should be understood that, in the processing of step S7010, the blame ratio calculation unit 127 calculates as zero influence rate for each dangerous driving factor that has not been detected by the cause estimation processing unit 126.

The various dangerous driving factors that were the subjects of detection by the cause estimation processing unit 126 during the cause estimation processing are respectively shown in FIG. 7 as the dangerous driving factors U1 through Un and O1 through Om. As representative concrete examples of step S7000 for the dangerous driving factors U1, U2, . . . Un among the above factors that originate in the user, the calculation processing for user blame ratio performed by the blame ratio calculation unit 127 is shown, respectively, as steps S7001, S7002, and S7003. The user blame ratio calculation processing performed by the blame ratio calculation unit 127 for the other dangerous driving factors U3 through Un−1 is omitted from FIG. 7. Moreover, as representative concrete examples of step S7010 for the dangerous driving factors O1, O2, . . . Om that originate in causes external to the user, the calculation processing for the influence rate of each external cause performed by the blame ratio calculation unit 127 is shown, respectively, as steps S7011, S7012, and S7013. The external cause influence rate calculation processing performed by the blame ratio calculation unit 127 for the other dangerous driving factors O3 through Om−1 is omitted from FIG. 7. It should be understood that it would be possible to perform the processing of steps S7001 through S7003 and the processing of steps S7010 through S7013 in parallel as shown in FIG. 7, or alternatively in time series.

In step S7020 the blame ratio calculation unit 127 calculates an overall blame ratio for the user, on the basis of the blame ratios for the user calculated for each of the various dangerous driving factors in step S7000, and the influence rates of external causes calculated for each of the various dangerous driving factors in step S7010. In concrete terms, among the dangerous driving factors that originate with the user, the one for which the blame ratio for the user calculated in step S7000 is the maximum is specified as being the main cause of dangerous driving that is due to mistake by the user. Moreover, the ones for which the blame ratio differences from that main cause are within a predetermined value (for example, 5%) are specified as being subsidiary causes of dangerous driving that is due to mistake by the user. Moreover, among the dangerous driving factors that originate with external causes, the one for which the influence rate calculated in step S7010 is the maximum is specified as being the main cause of dangerous driving that is not due to mistake by the user. Further, the ones for which the influence rate differences from that main cause are within a predetermined value (for example, 5%) are specified as being subsidiary causes of dangerous driving that is not due to mistake by the user.

It should be understood that the determination of the main cause and the subsidiary cause in step S7020 may be performed by employing methods of various types other than that explained in the above description. For example it would also be acceptable to arrange to estimate the cause of dangerous driving on the basis of sensor information of various kinds, by employing a machine learning technique or a statistical technique such as a neural network, a genetic algorithm, Bayesian estimation, correlation analysis, principal component analysis, or the like.

As has been explained above, after having specified the main cause and any subsidiary causes for dangerous driving due to mistake by the user and the main cause and any subsidiary causes for dangerous driving not due to mistake by the user, the blame ratio calculation unit 127 calculates an overall blame ratio for the user on the basis of the blame ratios for the user and the influence rates of external causes that have been calculated for these various causes in steps S7000 and S7010 respectively. For example, it is possible to calculate the overall blame ratio of the user by obtaining the differential between the blame ratio for the user in respect of the main cause of dangerous driving that is due to mistake by the user, and the external cause influence rate in respect of the main cause of dangerous driving that is not due to mistake by the user. At this time, it would also be acceptable to calculate the overall blame ratio of the user while considering the blame ratios for the user and the external cause influence rates in respect of the subsidiary causes. After processing of step S7020 has been executed, the blame ratio calculation unit 127 outputs the blame ratios for the user and the influence rates of external causes with respect to the various dangerous driving factors that were calculated in steps S7000 and S7010 respectively together with the overall blame ratio of the user that has been calculated in step S7020, and then the flow of control is transferred to step S2107 of FIG. 2.

Figure 8A:
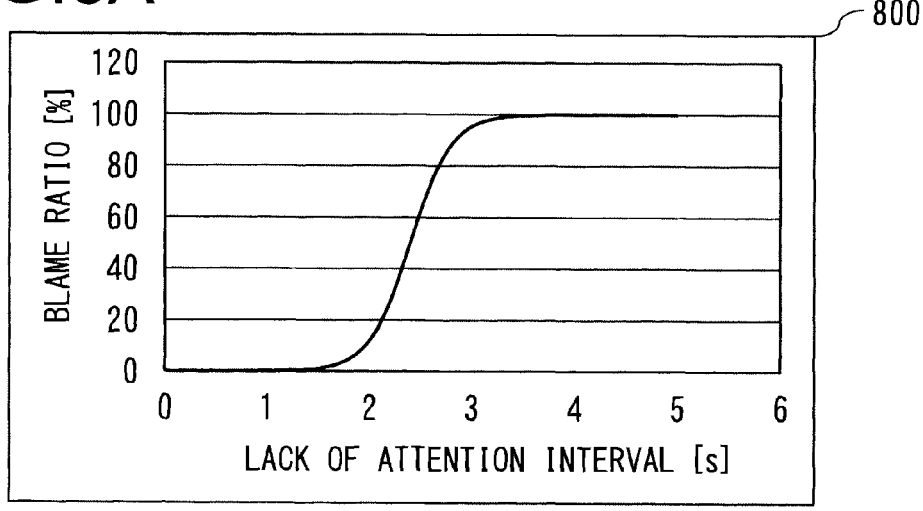
FIGS. 8A, 8B, and 8C are graphs showing examples of data for using to calculate the blame ratio of to be attributed to a user in connection with dangerous driving factors.
Figure 8B:
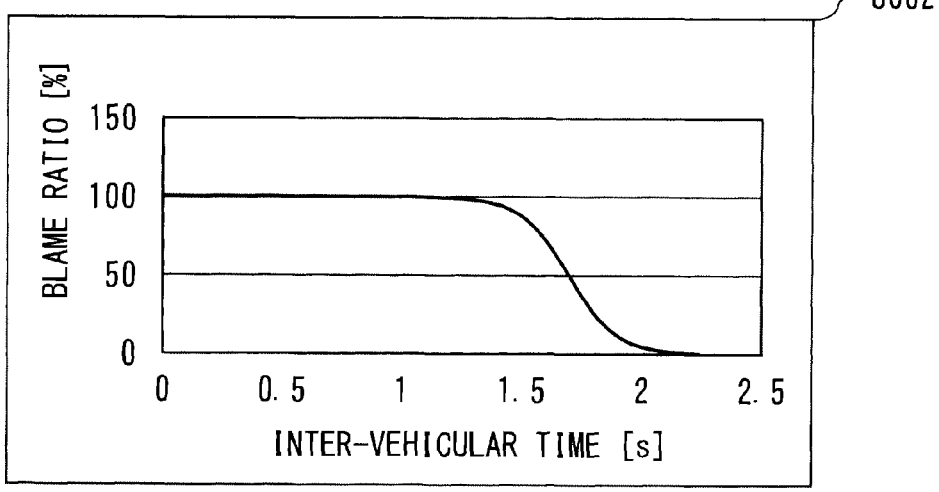
Figure 8C:
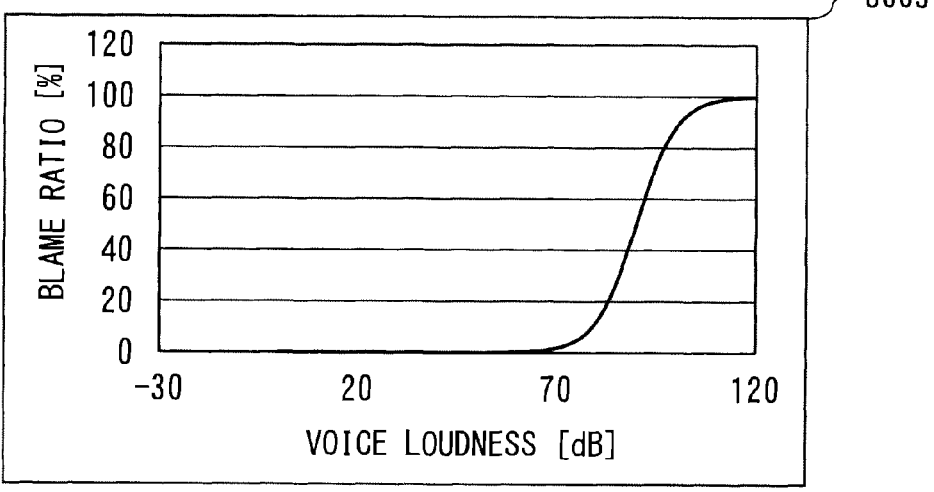

Next, specific examples of the processing that is performed in steps S7001 through S7003 of FIG. 7 will be explained. FIG. 8A, FIG. 8B, and FIG. 8C are graphs showing examples of data used for calculating the blame ratio of the user in respect of various dangerous driving factors.

FIG. 8A is a graph showing the relationship between the time period that the user has been distracted and blame ratio. The data according to this graph is employed in order to calculate the blame ratio of the user in respect of distracted driving, which is the dangerous driving factor that corresponds to the processing of steps S5002 and S5202 of FIG. 5.

Generally, for the user who is driving the subject vehicle, the time interval in which the negative influence upon his driving is low even though his eye-gaze wanders from forward because he is checking the speedometer or operating a device such as an air conditioner or the like may be considered to be around 0.8 seconds to 1.5 seconds. Namely, with a lack of attention for more than 1.5 seconds, it is considered that the level of danger in regard to driving is increased. Due to this, the blame ratio of the user in respect of driving with lack of attention may, for example, be shown by the graph of FIG. 8A. This graph is calculated according to Equation (1) below. In this case, in Equation (1), x denotes the time interval of lack of attention, and R denotes the blame ratio for the user. It should be understood that the constants a and b in Equation (1) may be set to any appropriate numerical values. In concrete terms, it may be contemplated to set a=6 and b=2 or the like. Moreover, it would also be acceptable to arrange to calculate the blame ratio for the user in respect of distracted driving by using some function other than Equation (1).

Equation (1)

$$R = \frac{100}{1 + e^{-ax+b}} \quad (1)$$

FIG. 8B is a graph showing the relationship between the inter-vehicular time between the subject vehicle and the vehicle in front and blame ratio for the user. The data according to this graph is employed in order to calculate the blame ratio of the user in respect of non-observance of the appropriate inter-vehicular distance, which is the dangerous driving factor that corresponds to the processing of steps S5003 and S5203 of FIG. 5. It should be understood that the inter-vehicular time is the time interval in seconds between the vehicle in front passing through some ground point and the subject vehicle passing through that ground point, and is obtained from the inter-vehicular distance between the subject vehicle and the vehicle in front and the speed of the subject vehicle. Since the inter-vehicular distance that should be respected varies according to the speed of the subject vehicle, accordingly it is desirable for the blame ratio of the user in respect of non-observance of the inter-vehicular distance to be expressed in terms of the inter-vehicular time.

Generally, for a user who is driving the subject vehicle while following another vehicle in front, it is considered that danger starts to become serious when the inter-vehicular time becomes around 1.5 seconds to 1.8 seconds. Moreover, as an inter-vehicular time for safe driving, it is recommended to observe an inter-vehicular time of two seconds or more. Due to this, the blame ratio of the user in respect of non-observance of the inter-vehicular distance may, for example, be shown by the graph of FIG. 8B. This graph is calculated according to Equation (2) below. In this case, in Equation (2), x denotes the inter-vehicular time, and R denotes the blame ratio for the user. It should be understood that the constants c and d in Equation (2) may be set to any appropriate numerical values. In concrete terms, it may be contemplated to set c=10 and d=17 or the like. Moreover, it would also be acceptable to arrange to calculate the blame ratio for the user in respect of non-observance of the inter-vehicular distance by using some function other than Equation (2).

Equation (2)

$$R = 100 - \frac{100}{1 + e^{-cx+d}} \quad (2)$$

FIG. 8C is a graph showing the relationship between the loudness of the voice of the user during conversation and blame ratio. The data according to this graph is employed in order to calculate the blame ratio of the user for conversing while driving, which is the dangerous driving factor that corresponds to the processing of steps S5004 and S5204 of FIG. 5.

Generally, the voice loudness measured within a vehicle while traveling is around 70 decibels. Due to this, if the loudness of a voice during conversation continues in the state of being 70 decibels or greater, then it may be considered that the user is giving attention to this conversation, and that this situation is dangerous because he cannot give proper attention to driving. Accordingly, the blame ratio of the user in respect of conversation while driving may for example, be shown by the graph of FIG. 8C. This graph is calculated according to Equation (1) described above, in a similar manner to the case in FIG. 8A. In this case, in Equation (1), x denotes the voice loudness, and R denotes the blame ratio for the user. It should be understood that the constants a and b in Equation (1) may be set to any appropriate numerical values. In concrete terms, it may be contemplated to set a=0.2 and b=18 or the like. Moreover, it would also be acceptable to arrange to calculate the blame ratio for the user in respect of conversing while driving by using some function other than Equation (1).

Next, screens that are displayed upon the input/output device 201 of the in-vehicle device 200 in step S3003 of FIG. 3 will be explained. FIG. 9A through FIG. 18B explained below are figures showing examples of screens that display driving characteristics diagnosis result upon the input/output device 201. By appropriately actuating the input/output device 201, the user is able freely to change over between screens like those shown in FIG. 9A through FIG. 18d. It should be understood that it would also be possible to employ some method of presenting the driving characteristics diagnosis result to the user, other than the method of using the display screens shown in FIG. 9A through FIG. 18B. Moreover, the method may also be considered of not showing to the user information of various types for presenting the driving characteristics diagnosis result by changing over between a plurality of display screens as shown in FIG. 9A through FIG. 18B, but of displaying all the types of information together upon a single screen.

Figure 9A:
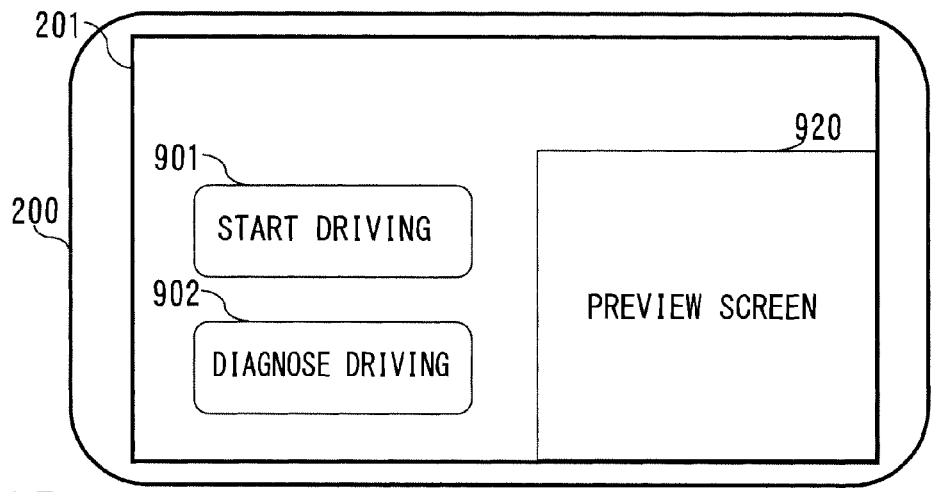
FIG. 9A, FIG. 9B, and FIG. 9C are figures showing examples of screens for display of driving characteristics diagnosis result.

FIG. 9A is an example of a screen that is displayed before driving of the subject vehicle is started. When the user presses a driving start button 901 upon the screen of FIG. 9A, the in-vehicle device 200 detects, in step S2001 of FIG. 2, the start of driving of the subject vehicle. Moreover, when the user presses a driving diagnosis button 902 upon the screen, in step S3001 of FIG. 3, the in-vehicle device 200 detects a start request from the user for driving characteristics diagnosis result. And the image captured by the camera 206 in the vicinity of the subject vehicle or the like is displayed upon a preview screen 920.

Figure 9B:
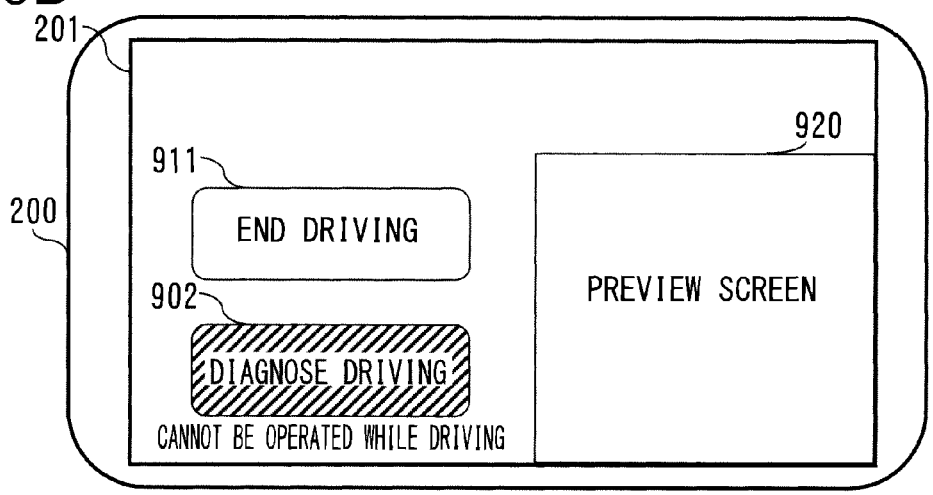

FIG. 9B is an example of a screen that is displayed while the subject vehicle is being driven. Pressing the driving diagnosis button 902 on the screen of FIG. 9B is prohibited, so a message is displayed to the effect that it cannot be operated during driving. Moreover, a driving end button 911 is displayed instead of the driving start button 901 of FIG. 9A. When the user presses the driving end button 911 on the screen, the in-vehicle device 200 determines, in step S2004 of FIG. 2, that driving of the subject vehicle is no longer continuing, and the flow of control proceeds to step S2005 in which the end of driving is detected.

Figure 9C:
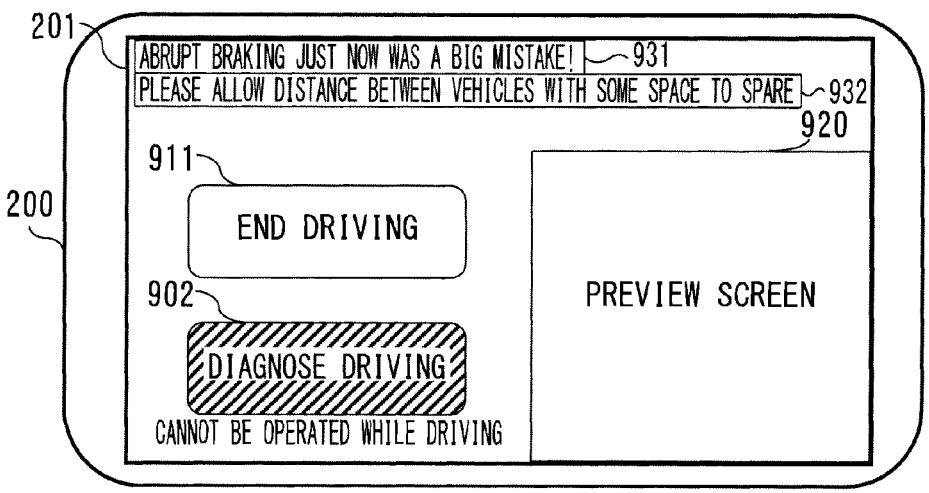

FIG. 9C shows an example of a screen that is displayed when diagnosis result for driving characteristics have been received from the telematics center 100 due to detection of dangerous driving of the subject vehicle. A notification message 931 specifying a blame ratio for the user in respect of dangerous driving that has been detected is displayed upon the screen of FIG. 9C. Moreover, as driving advice to the user in relation to non-observance of the inter-vehicular distance that has been detected by the dangerous driving cause estimation processing, a notification message 932 is displayed on this screen to the effect that the inter-vehicular distance between the subject vehicle and the vehicle in front ought to be greater. It should be understood that it would also be acceptable to arrange to output a sound or vibration, or to flash a light emission device not shown in the figures, in order to notice the attention of the user to these notification messages 931 and 932 while he is driving.

Figure 10A:
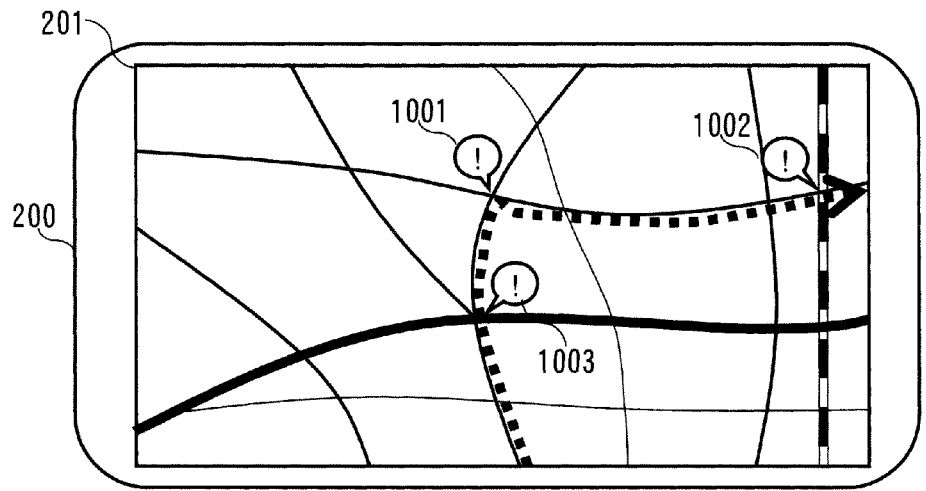
FIG. 10A, FIG. 10B, and FIG. 10C are figures showing examples of screens for display of driving characteristics diagnosis result.
Figure 10B:
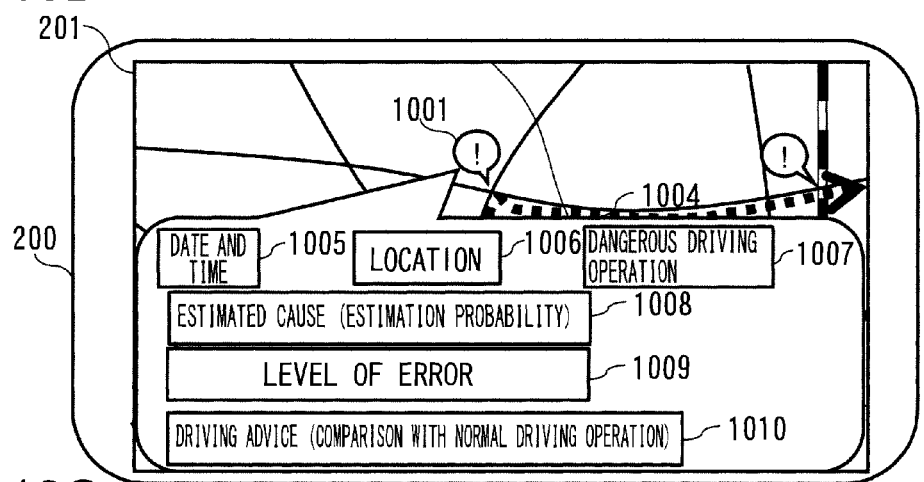
Figure 10C:
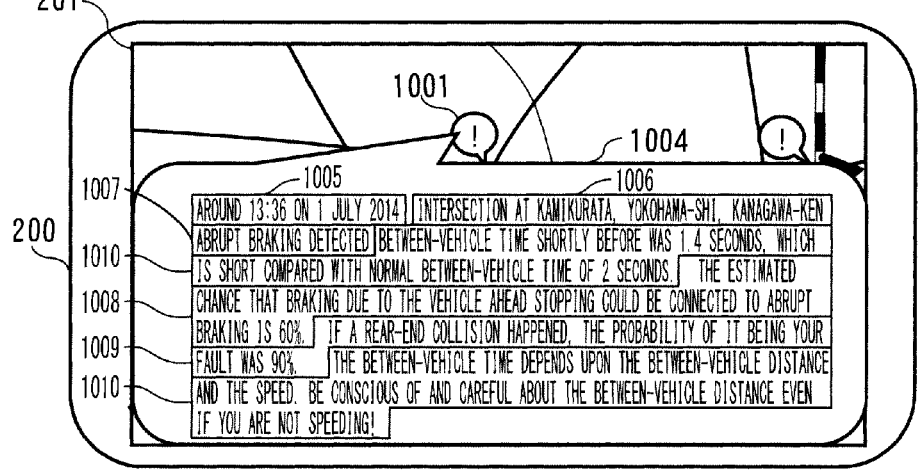

Referring to FIG. 10A through FIG. 10C, screens for displaying result of diagnosis of driving characteristics that employ maps will now be explained.

FIG. 10A is an example of a screen upon which the result of diagnosis of driving characteristics that have been received from the telematics center 100 are shown upon a map. On the screen of FIG. 10A, balloons 1001 through 1003 are displayed upon this map in order to indicate ground points at which dangerous driving of the subject vehicle has been detected.

And FIG. 10B is an example of a screen that is displayed when the user has selected the balloon 1001 on the screen of FIG. 10A. Detailed information 1004 for dangerous driving of the subject vehicle that has been detected at the ground point shown by the balloon 1001 is displayed on the screen of FIG. 10B. This detailed information 1004 includes the date and time 1005, the location 1006, the dangerous driving operation 1007, the estimated cause 1008 of dangerous driving, the blame ratio for the user 1009, driving advice 1010, and so on. For example, the main cause of dangerous driving specified in step S7020 of FIG. 7 or the like may be displayed as the estimated cause 1008 of dangerous driving. It should be understood that, in addition to the main cause of dangerous driving, it would also be acceptable to arrange to display, in this field for the estimated cause 1008 of dangerous driving, the estimation probability that this cause led to dangerous driving, or the like.

FIG. 10C is a specific example of the screen shown in FIG. 10B. Text is displayed on this screen of FIG. 10C, giving specific contents for each of the fields for the date and time 1005, the location 1006, the dangerous driving operation 1007, the estimated cause 1008 of dangerous driving, the blame ratio for the user 1009, and the driving advice 1010.

It should be understood that it would also be acceptable for the detailed information 1004 shown in FIG. 10B and FIG. 10C not to include information about all of these factors, i.e. specifying all of the date and time 1005, the location 1006, the dangerous driving operation 1007, the estimated cause 1008 of dangerous driving, the blame ratio for the user 1009, and the driving advice 1010 described above. For example, it might be contemplated to omit the driving advice 1010, or the like. It would be possible to alleviate the burden upon the user for checking the contents of the detailed information 1004 by omitting display of one or more of the above items. In this case, it would be acceptable to enable the user to make an appropriate selection of which information factors are to be displayed; or it would also be acceptable to arrange for the in-vehicle device 200 to make such a selection automatically, according to the load upon the user and the like.

As has been explained above, if the user has driven the vehicle in a dangerous manner, then the in-vehicle device 200 is able to display upon the input/output device 201 a screen like those of FIG. 10B and FIG. 10C that includes at least one of: the date and time, and the location at which this dangerous driving was performed; the details of this dangerous driving; the cause of this dangerous driving; the blame ratio of the user in relation to this dangerous driving; and driving advice for the user in relation to this dangerous driving. In step S3103 of FIG. 3, as driving characteristics diagnosis result, the diagnosis result output unit 129 of the telematics center 100 outputs to the communication unit 140 information for causing the in-vehicle device 200 to display a screen of this sort. This information is transmitted by the communication unit 140 to the in-vehicle device 200 from the telematics center 100, and is received by the in-vehicle device 200.

Figure 11:
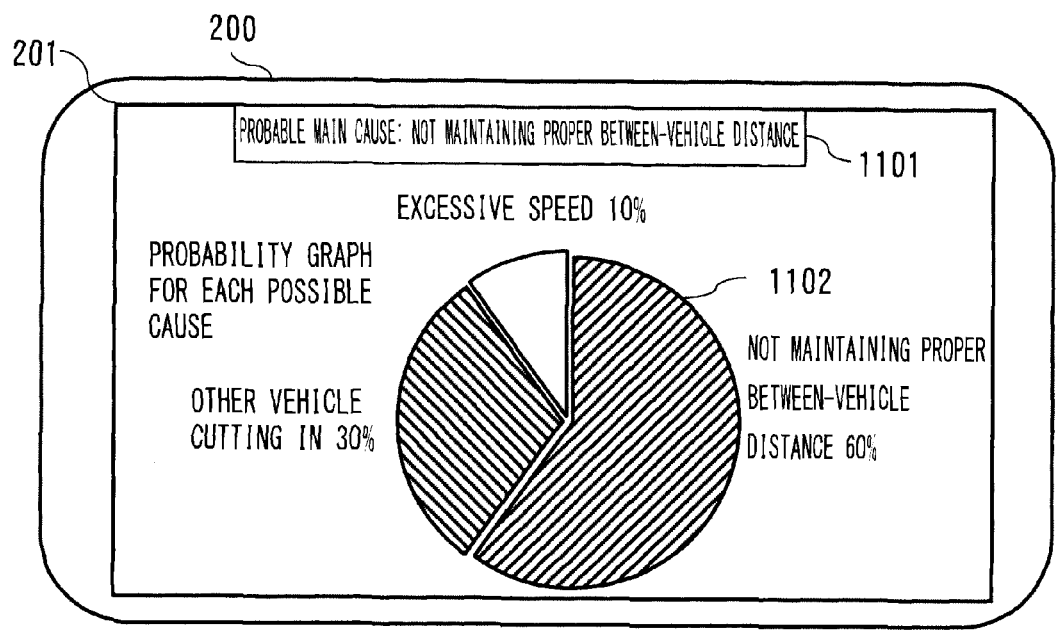
FIG. 11 is a figure showing an example of a screen for display of driving characteristics diagnosis result.

FIG. 11 is an example of a screen that is used for displaying estimated causes of dangerous driving by using a pie chart. The main cause 1101 that has been estimated for dangerous driving, and a pie chart 1102 that shows the estimation probabilities for various causes thereof, are displayed upon the screen of FIG. 11. This pie chart 1102 presents the main cause and the subsidiary causes of dangerous driving that have been specified in step S7020 of FIG. 7, and the estimation probabilities that these causes have led to such dangerous driving. The probabilities of the various causes in the pie chart 1102 may be determined on the basis of the blame ratios for the user or the influence rates of external causes, that were obtained in steps S7000 and S7010 of FIG. 7 respectively. It should be understood that, instead of the pie chart 1102, it would also be acceptable to arrange to use a graphic display in some other format, such as for example a bar chart or the like.

Figure 12:
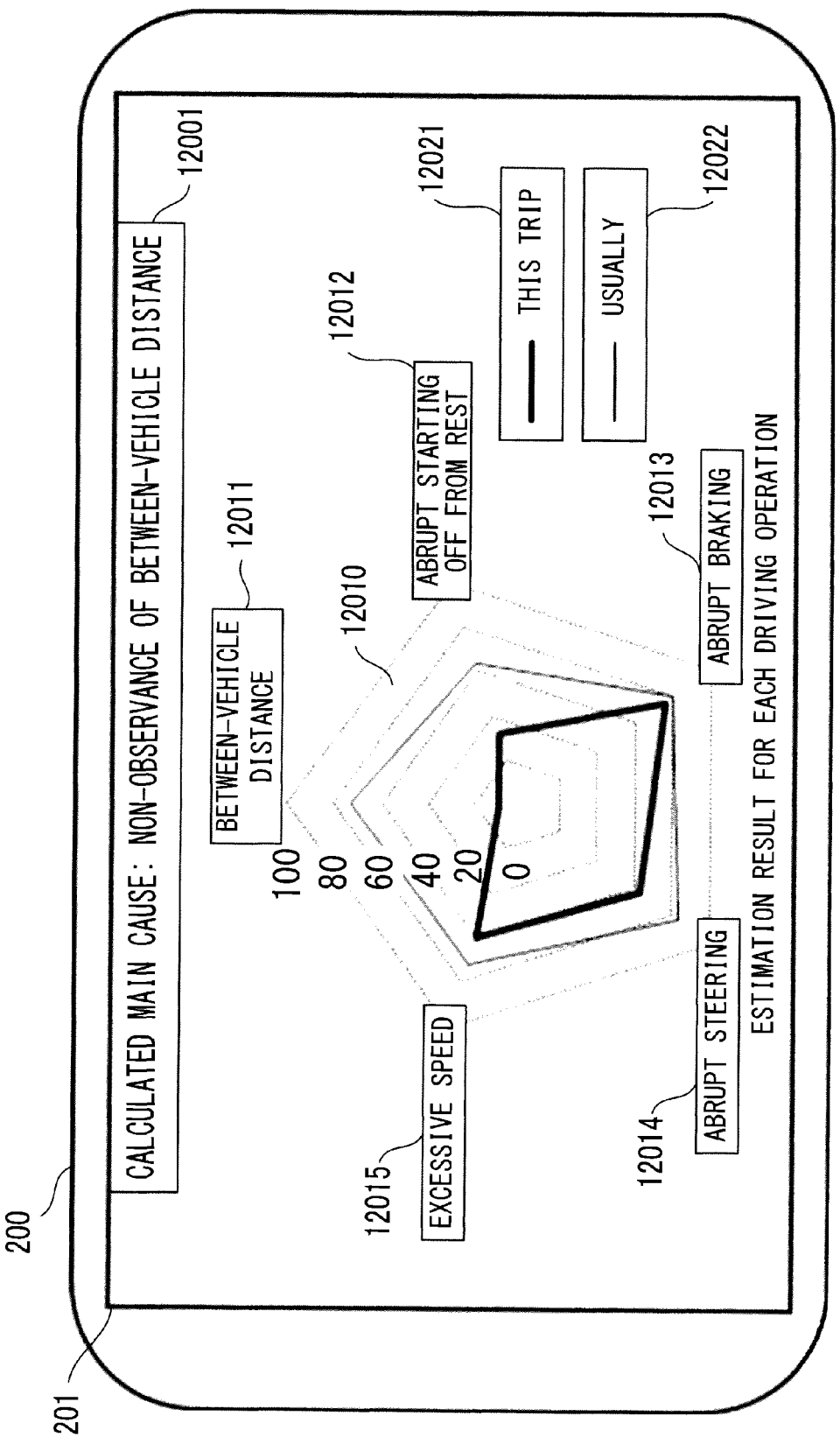
FIG. 12 is a figure showing another example of a screen for display of driving characteristics diagnosis result.

FIG. 12 is an example of a screen that displays an evaluation of driving by the user over a predetermined subject interval for evaluation. A main cause of dangerous driving 12001 that has been estimated and a radar chart 12010 that presents an evaluation of driving by the user are displayed upon the screen of FIG. 12. The radar chart 12010 presents numbers of evaluation points for the driving performance of the user for each of various driving factors, such as for example inter-vehicular distance 12011, abrupt starting off from rest 12012, abrupt braking 12013, abrupt steering 12014, excessive speed 12015, and so on.

The number of points evaluated for each of the driving factors on the radar chart 12010 can be calculated on the basis of the result of processing by the dangerous driving detection processing unit 125 and the cause estimation processing unit 126 in the evaluation subject interval. In other words, it is possible to calculate the number of points evaluated for each of the driving factors on the basis of the frequency of detection of abrupt deceleration and abrupt steering in the dangerous driving detection processing shown in FIG. 4 and on the basis of the frequency of detection of the various dangerous driving factors in the cause estimation processing of FIG. 5 and FIG. 6. In concrete terms, the number of points evaluated for the inter-vehicular distance 12011 is determined on the basis of the frequency at which inter-vehicular distance non-observance has been detected in step S5203 of FIG. 5 during the evaluation subject interval. And the number of points evaluated for the abrupt starting off from rest 12012 is determined on the basis of the frequency at which impatient driving has been detected in step S5208 of FIG. 5 during the evaluation subject interval. Moreover, the number of points evaluated for the abrupt braking 12013 is determined on the basis of the frequency at which abrupt deceleration has been detected in step S4001 of FIG. 4 during the evaluation subject interval. Furthermore, the number of points evaluated for the abrupt steering 12014 is determined on the basis of the frequency at which abrupt steering has been detected in step S4002 of FIG. 4 during the evaluation subject interval. And, the number of points evaluated for the excessive speed 12015 is determined on the basis of the frequency at which violation of the speed limit has been detected as a traffic law infringement in step S5216 of FIG. 6 during the evaluation subject interval. It should be understood that it would also be possible to calculate the numbers of points evaluated for these various driving factors by some methods other than those explained above.

By displaying the evaluation of the driving by the user in the format of a radar chart as in the screen example of FIG. 12, it is possible to present the evaluations for a plurality of driving factors at the same time. Moreover, with the screen example of FIG. 12, it is also possible to display the driving evaluation during diagnosis 12021 and the usual driving evaluation 12022 at the same time. Due to this, from the point of view of the user, there is the beneficial aspect that it becomes easy to form an overall evaluation in respect of his own driving, and to form a relative evaluation by comparing his driving during diagnosis with his usual driving and determining which is the worse, and so on. Furthermore, it would also be acceptable to arrange to display an average driving evaluation for all users combined. By doing this, it would be possible for the user to ascertain what his driving habits are really like by comparing them with those of a average user, and thereby to obtain an objective evaluation of his own driving.

Figure 13:
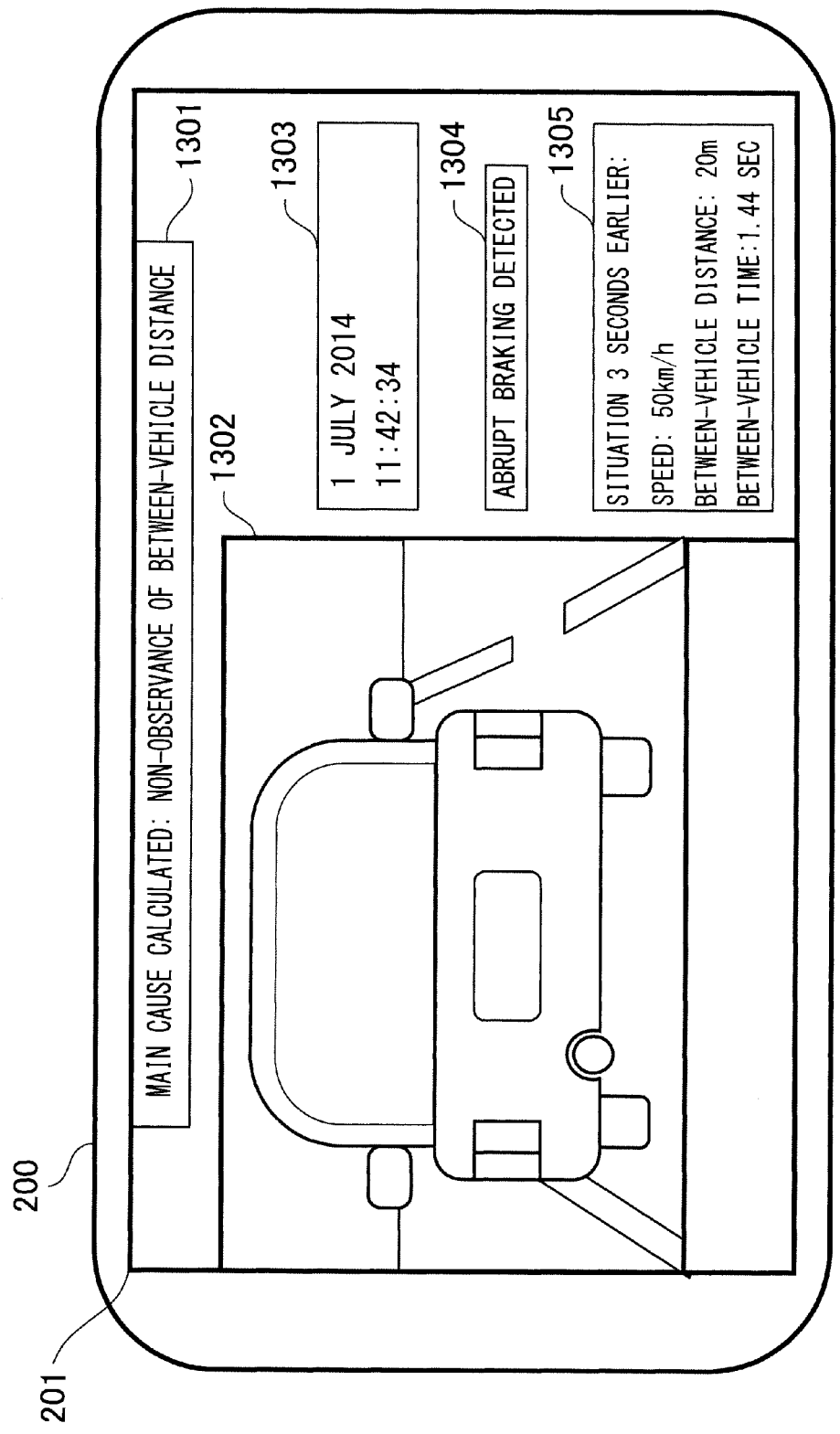
FIG. 13 is a figure showing yet another example of a screen for display of driving characteristics diagnosis result.

FIG. 13 is an example of a screen for display of driving characteristics diagnosis result using an image. On the screen of FIG. 13, there are shown the main cause 1301 that has been estimated for dangerous driving, an image 1302, the date and time 1303, a dangerous driving operation 1304, and sensor information 1305. The image 1302 displays the video image forward from the subject vehicle that was captured by the camera 206 over the interval a few seconds before and after the time point at which dangerous driving has been detected. It should be understood that, instead of the video image that was captured by the camera 206, for example, it would also be acceptable to arrange to display, as the image 1302, an animated image showing the situation around the subject vehicle that has been estimated on the basis of the sensor information or the like, or alternatively, for each type of dangerous driving, an image of a typical example of such dangerous driving that has been stored in advance. Moreover, in order to make it possible for the user objectively to ascertain the nature of the dangerous driving situation, it would also be acceptable to arrange to display an image as seen from a bird's eye viewpoint.

Figure 14A:
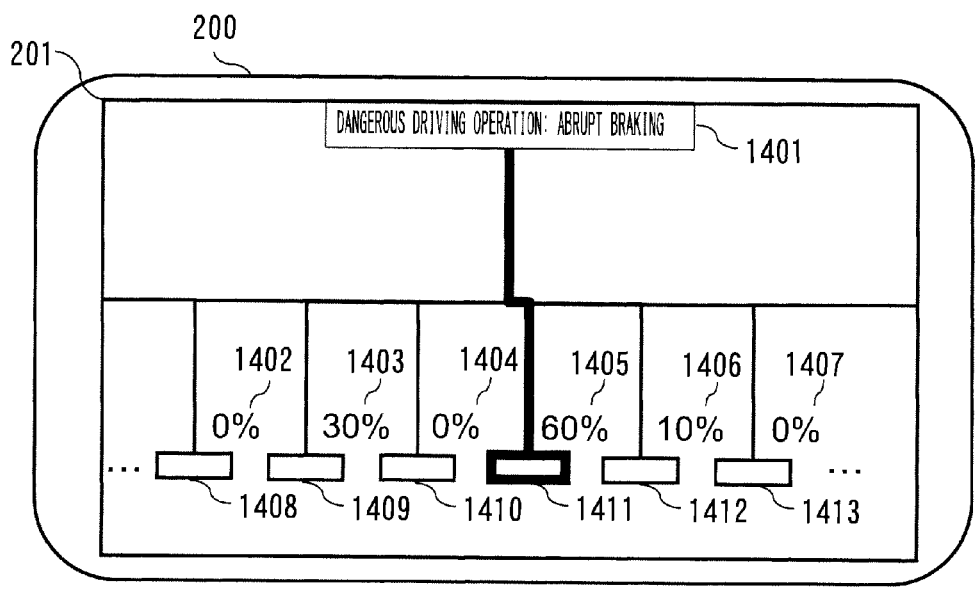
FIG. 14A and FIG. 14B are figures showing yet other examples of screens for display of driving characteristics diagnosis result.

FIG. 14A is an example of a screen that displays the processing of estimating the causes of dangerous driving in a flow chart format. A dangerous driving operation 1401 that has been detected, causes 1408 through 1413 each of which has been estimated as a dangerous driving factor for the dangerous driving operation 1401, and estimation probabilities 1402 through 1407 for each of these causes, are displayed upon the screen of FIG. 14A. The estimation probabilities 1402 through 1407 may be determined on the basis of the blame ratios for the user or the influence rates of external causes that were obtained for the causes 1408 through 1403 in steps S7000 and S7010 of FIG. 7. With a screen of this type, it is possible for the user to ascertain which dangerous driving factor has been estimated as being the cause of his dangerous driving.

Figure 14B:
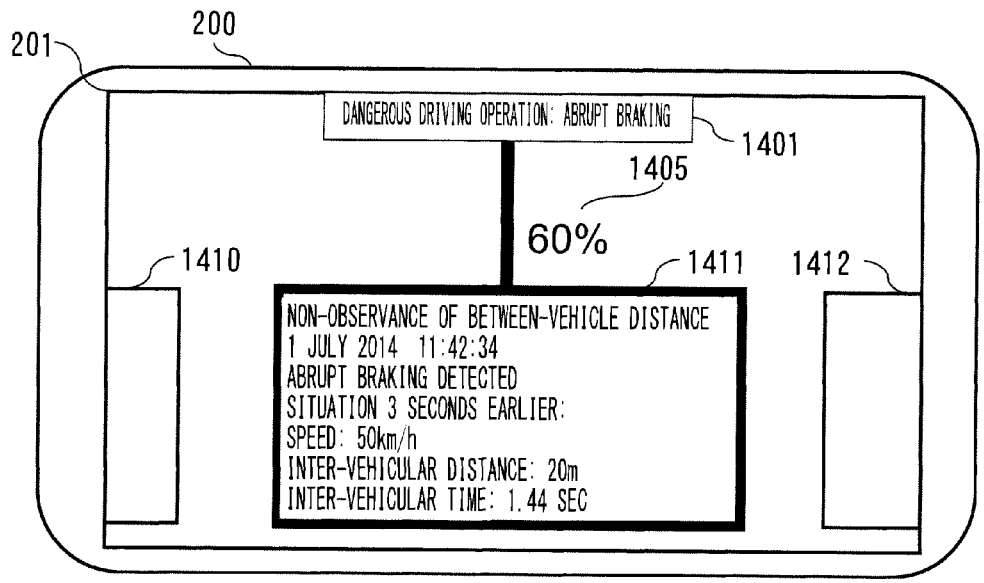

FIG. 14B shows an example when the main cause portion 1411 of the dangerous driving operation 1401 in FIG. 14A is displayed as enlarged. With this type of enlarged display, as the details of the main cause 1411, the user is able to check upon the operational state of the subject vehicle and the surrounding situation when the dangerous driving operation 1401 was detected. It should be understood that the contents that are displayed as the details of the main cause 1411 may vary according to the sensors mounted to the subject vehicle and so on.

Figure 15A:
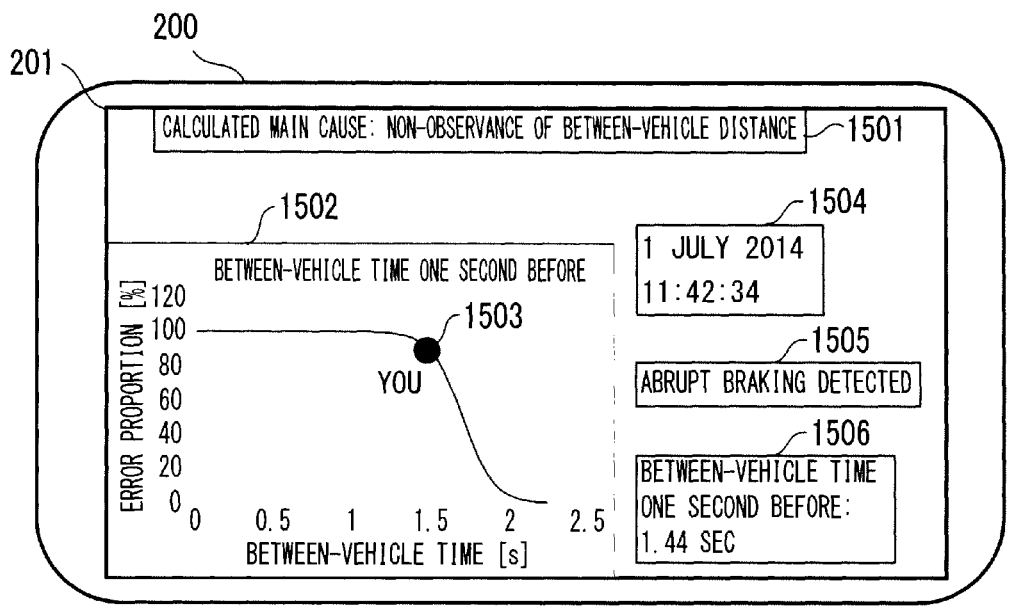
FIG. 15A and FIG. 15B are figures showing examples of screens for display of driving characteristics diagnosis result.

FIG. 15A is an example of a screen showing the calculation process for the blame ratio to be attributed to the user in relation to the main cause of dangerous driving that has been estimated. The main cause 1501 of abrupt braking which has been detected as being dangerous driving, a graph 1502 that presents a relationship between the inter-vehicular time of the subject vehicle and the degree of mistake by the user in relation to this main cause 1501, the date and time 1504, the result of dangerous driving detection 1505, and the inter-vehicular time 1506 shortly before this dangerous driving, are displayed upon the screen shown in FIG. 15A. A point 1503 is shown on the graph 1502 corresponding to the state of driving by the user when dangerous driving was detected. Due to these arrangements, the user is able visually to ascertain how the blame ratio in relation to the main cause 1501 has been calculated. And, because of this, it is possible for him to understand by direct visual observation how he ought to improve his driving in order to avoid such dangerous driving in the future. It should be understood that since, in the screen example of FIG. 15A, the main cause 1501 of dangerous driving is non-observance of the inter-vehicular distance, accordingly, corresponding thereto, the relationship between the inter-vehicular time of the subject vehicle and the blame ratio of the user is shown as the graph 1502. If some other dangerous driving factor has been estimated as the main cause of the dangerous driving, then it is desirable for the contents of the graph 1502 to be changed according thereto. Moreover, as well as the main cause of the dangerous driving, it would also be acceptable to arrange to make it possible for any subsidiary causes of the dangerous driving to be displayed upon a screen like the one of FIG. 15A.

Figure 15B:
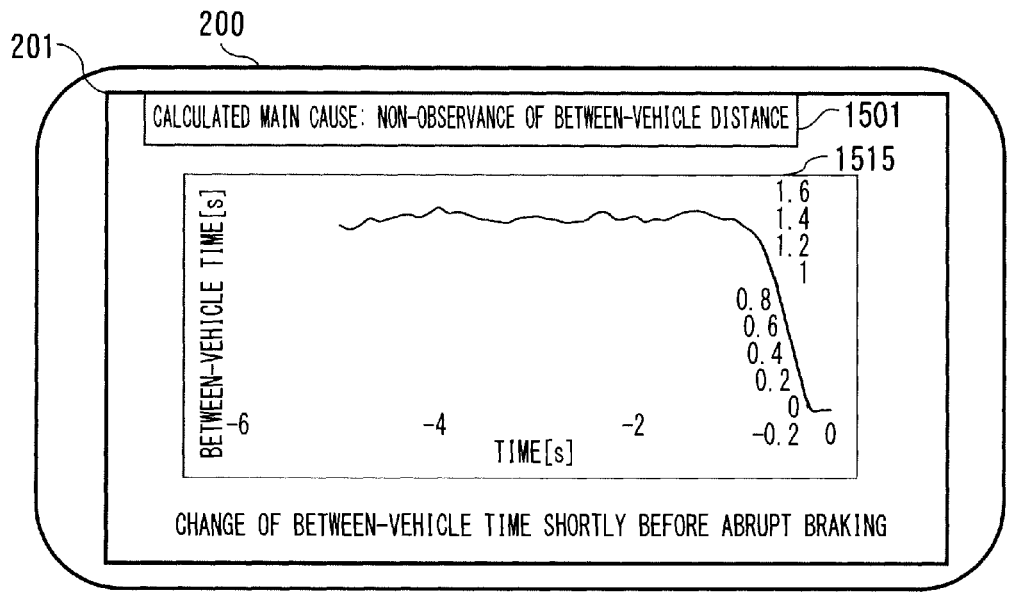

And FIG. 15B is an example of a screen that presents the state of driving by the user in time series with respect to the main cause of dangerous driving that has been estimated. The main cause 1501 of abrupt braking which has been detected as being dangerous driving, and a graph 1515 that shows the state of driving by the user in time series with respect to this main cause 1501, are displayed upon the screen of FIG. 15B.

For the state of driving by the user with respect to the main cause 1501, the graph 1515 shows in time series the change of the inter-vehicular time of the subject vehicle shortly before abrupt braking was detected. Due to this, it is possible for the user objectively to ascertain the state of his own driving when dangerous driving was detected. It should be understood that since, in the screen example of FIG. 15B, the main cause 1501 of dangerous driving is non-observance of the inter-vehicular distance, accordingly, corresponding thereto, the transition of the inter-vehicular time of the subject vehicle is shown as the graph 1515. If some other dangerous driving factor has been estimated as the main cause of the dangerous driving, then it is desirable for the contents of the graph 1515 to be changed according thereto. Moreover, as well as the main cause of the dangerous driving, it would also be acceptable to arrange to make it possible for subsidiary causes of dangerous driving to be displayed upon a screen like the one of FIG. 15B.

Figure 16:
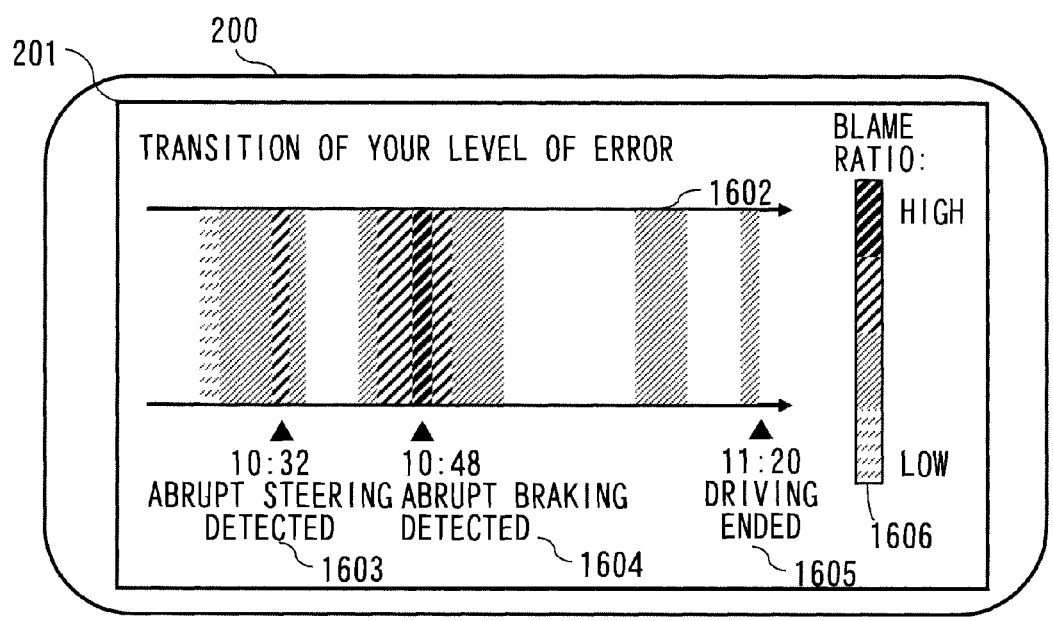
FIG. 16 is figure showing an example of a screen for display of driving characteristics diagnosis result.

FIG. 16 is an example of a screen that shows the transition of the blame ratio for the user while he is driving the subject vehicle in time series. A graph 1602 that shows the transition of the blame ratio for the user in time series, event displays 1603, 1604, and 1605 that show the time points that dangerous driving has been detected and the details thereof, and the time point of ending of driving and so on, and a degree 1606 for explaining the blame ratios on the graph 1602, are displayed upon the screen of FIG. 16. Due to this, the user is able to ascertain in a synoptic manner to what extent he has been performing driving for which the blame ratio is high, in other words to what extent he has been performing driving for which the level of danger is high. It should be understood that it would also be possible to arrange to display information about the locations at which dangerous driving was detected or the like as events upon the graph 1602. Moreover, it would also be acceptable to arrange not to display the events 1603 and 1604 at first, and to display them as appropriate, according to operation by the user. Further, it would also be possible to arrange to employ some other display format for the graph 1602, other than the color shading shown in FIG. 16. For example, it might be contemplated to display predetermined mark in order of time series, and to show the blame ratio according to their moving speeds, or to show the blame ratio in time series by using a line graph, or the like.

Figure 17:
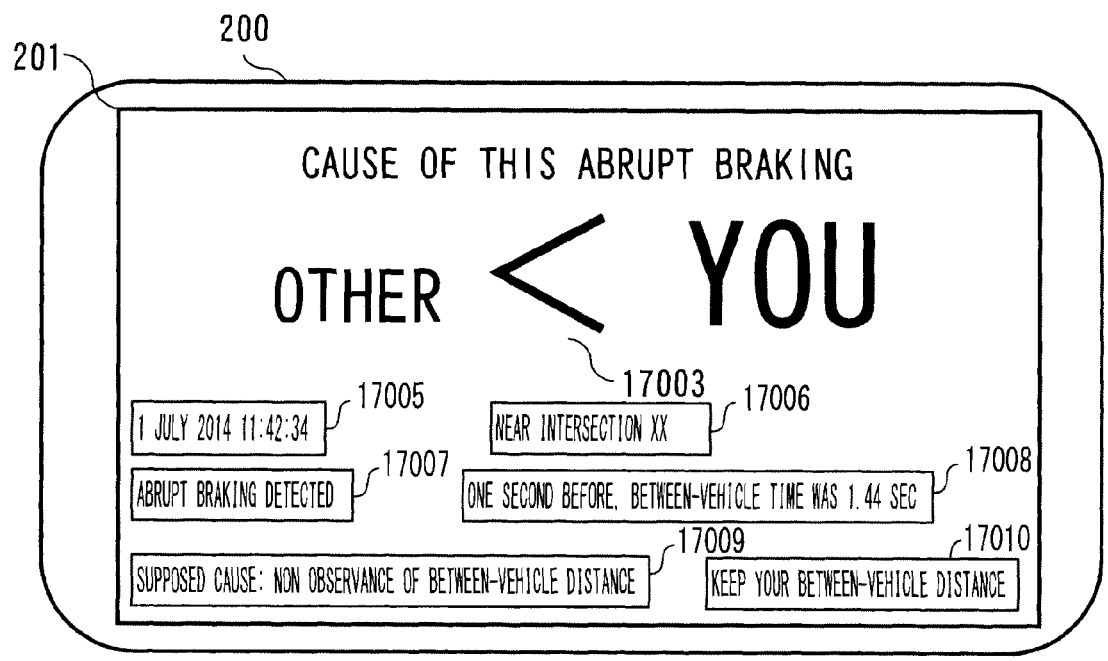
FIG. 17 is figure showing an example of a screen for display of driving characteristics diagnosis result.

FIG. 17 is an example of a screen showing a relationship between the blame ratio of the user and the influence rate due to external causes, in relation to the main cause of dangerous driving that has been estimated. An inequality sign 17003 that presents the fact that the blame ratio of the user in relation to abrupt braking which has been detected as being dangerous driving is larger than the influence rates due to external causes, and detailed information related to this dangerous driving that has been detected, are displayed upon the screen of FIG. 17. The detailed information includes the date and time 17005, the location 17006, the type of the dangerous driving operation 17007, sensor information 17008, the estimated cause 17009, driving advice 17010, and so on. Due to this it is possible to provide diagnosis result for driving characteristics that carry a high reliability and convey a high conviction to the user, even if action to avoid an external cause such as dangerous driving by some other vehicle or the like has been detected as being dangerous driving. It should be understood that the contents of the detailed information on the screen of FIG. 17 may also be supplemented, deleted, or changed as appropriate.

Figure 18A:
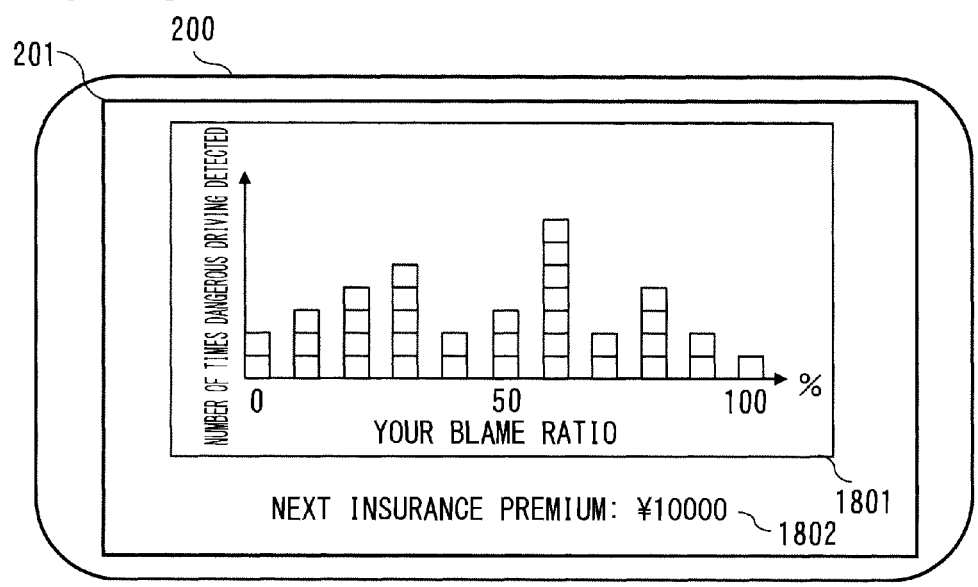
FIG. 18A and FIG. 18B are figures showing examples of screens for display of driving characteristics diagnosis result.

FIG. 18A is an example of a screen showing a relationship between the history of dangerous driving that has been detected and automobile insurance premium. A graph 1801 that shows the history of detection of dangerous driving by the user and the automobile insurance premium 1802 that he must pay next time are displayed upon the screen of FIG. 18A. The graph 1801 shows the number of times that dangerous driving has been detected within some predetermined interval (for example, the interval from the day that the previous payment for automobile insurance was made until the present) plotted against the blame ratio of the user for these various occurrences of dangerous driving. The automobile insurance premium 1802 to be paid next time represents an estimation of the amount of insurance premium to be paid when the user updates his current contract for automobile insurance on the next renewal date. This amount of money is determined according to the blame ratio for the user in the history of detection of dangerous driving shown by the graph 1801.

Figure 18B:
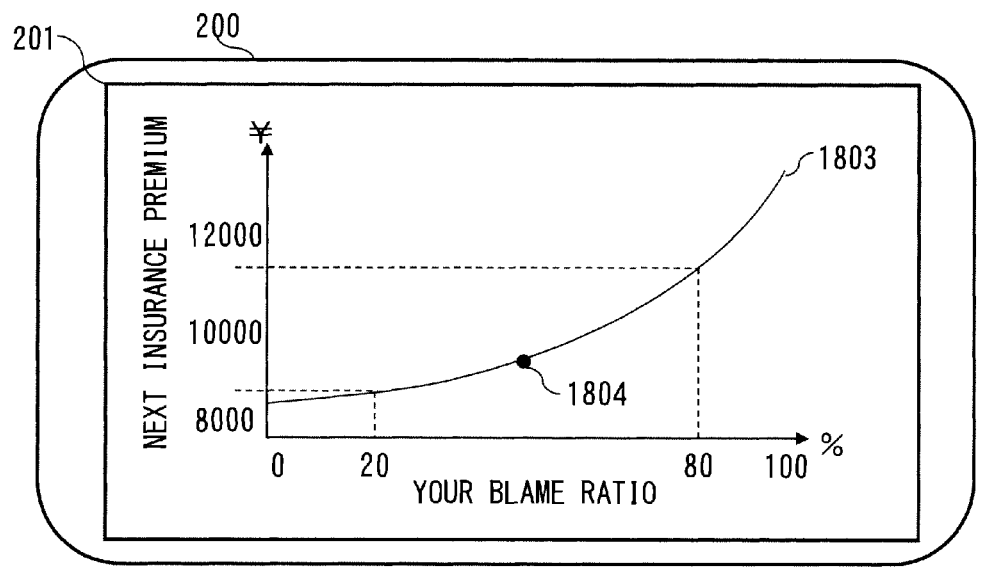

FIG. 18B is an example of screen showing a relationship between the blame ratio attributed to the user and his automobile insurance premium. The values along the horizontal axis of the graph 1803 show the overall blame ratio for the user in relation to dangerous driving that has been detected during a predetermined contract interval, while the values along the vertical axis of the graph 1803 show an estimation of the cost of the insurance premium that will be applied when the user updates his current automobile insurance contract on the next renewal date. A point 1804 is displayed upon the graph 1803, showing to which position upon the graph 1803 the operational state of the user up to the present time corresponds. It should be understood that it would also be acceptable to change the relationship between the blame ratio for the user and his automobile insurance premium by varying the slope of the graph 1803 or the values along its vertical axis according to the number of times that dangerous driving has been detected, or according to the frequency of dangerous driving.

It should be understood that it could be arranged to display the screens for displaying the result of driving characteristics diagnosis explained with reference to FIG. 9A through 18B automatically upon the input/output device 201 of the in-vehicle device 200 shortly after dangerous driving by the user has been detected, or when driving of the subject vehicle by the user has been resumed after dangerous driving has been detected, or the like. In this case, it is desirable for the diagnosis result output unit 129 of the telematics center 100 to execute the processing of steps S3102 and S3103 of FIG. 3 automatically when dangerous driving by the user has been detected by the dangerous driving detection processing unit 125, or when thereafter it has been determined that driving of the subject vehicle has been resumed. At this time, the decision as to whether or not driving of the subject vehicle has been resumed may be performed on the basis of the timing of transmission of probe information 232 from the in-vehicle device 200 to the telematics center 100. Alternatively, it would also be acceptable to arrange to determine whether or not driving of the subject vehicle has been resumed, on the basis of the measurement result for the speed of the subject vehicle, its acceleration, its traveling position or the like that are included in the probe information 132 being accumulated in the storage device 130 of the telematics center 100. By doing this, it is possible to transmit the result of diagnosis of driving characteristics from the telematics center 100 to the in-vehicle device 200 at a desired timing, and to cause them to be outputted upon the input/output device 201. Due to this, it is possible to notice the attention of the user who has performed dangerous driving in an effective manner in order to prevent similar dangerous driving in the future. Moreover, it would also be possible to arrange to perform processing such as that described above only if the blame ratio of the user in relation to this dangerous driving is greater than a certain predetermined value. By doing this, it is possible to suppress the provision of unnecessary screen display if the blame ratio for the user is low, and accordingly it is not particularly necessary to notice his attention to the dangerous driving.

According to the embodiment of the present invention explained above, the following beneficial operational effects are obtained.

(1) The telematics center 100 comprises: the probe information acquisition unit 121 that acquires the probe information 132 related to the operational state of the vehicle from the in-vehicle device 200; the dangerous driving detection processing unit 125 that detects dangerous driving of the vehicle by the user on the basis of the probe information 132 acquired by the probe information acquisition unit 121; the cause estimation processing unit 126 that estimates the cause of dangerous driving; the driving characteristics diagnosis processing unit 128 that performs diagnosis of the driving characteristics of the user on the basis of the result of dangerous driving detection by the dangerous driving detection processing unit 125 and the cause of dangerous driving estimated by the cause estimation processing unit 126; and the diagnosis result output unit 129 that outputs the result of diagnosis of driving characteristics that have been diagnosed by the driving characteristics diagnosis processing unit 128. Since it is arranged to do this, accordingly it is possible to give consideration to external causes, and thereby to perform driving characteristics diagnosis and information output that will convey great conviction to the user.

(2) As shown in the screen examples of FIG. 10B and FIG. 10C, it is desirable for the result of diagnosis of driving characteristics that are outputted from the diagnosis result output unit 129 to include information specifying the date and time and the location at which dangerous driving was detected, information specifying the details of the dangerous driving, and information presenting the cause of the dangerous driving. By doing this, it is possible to present the result of driving characteristics diagnosis to the user in a manner that is easy to understand.

(3) As shown in the screen examples of FIG. 10B and FIG. 10C, it is also possible to arrange for the result of diagnosis of driving characteristics that are outputted from the diagnosis result output unit 129 further to include information presenting driving advice to the user in relation to his dangerous driving. By doing this, it is possible to present a user who has performed dangerous driving with information relating to which aspects of his driving he needs to improve in a manner that is easy to understand.

(4) In the cause estimation processing shown in FIG. 5 and FIG. 6, the cause estimation processing unit 126 estimates the cause of dangerous driving on the basis of at least one of: the probe information 132 acquired by the vehicle; weather information corresponding to the traveling position of the vehicle, acquired by the environmental information acquisition unit 123; map information corresponding to the traveling position of the vehicle; and road traffic information corresponding to the traveling position of the vehicle. In concrete terms, the cause estimation processing unit 126 estimates the cause of dangerous driving on the basis of the probe information 132 by performing the processing of steps S5001 through S5010 and the processing of steps S5201 through S5210 of FIG. 5 and the processing of steps S5011 through S5019 and steps S5211 through S5219 of FIG. 6. Moreover, the cause estimation processing unit 126 estimates the cause of dangerous driving by performing the processing of step S5015 and S5215 of FIG. 6 on the basis of the weather information, by performing the processing of step S5016 and S5216 of FIG. 6 on the basis of the map information, and by performing the processing of step S5017 and S5217 of FIG. 6 on the basis of the road traffic information. Since these arrangements are adopted, accordingly it is possible to estimate the causes of various types of dangerous driving in an accurate manner.

(5) In the cause estimation processing shown in FIG. 5 and FIG. 6, the cause estimation processing unit 126 estimates the cause of dangerous driving by performing a first decision processing in order to determine upon the presence or absence of dangerous driving factors that originate in the user, and a second decision processing in order to determine upon the presence or absence of dangerous driving factors that originate in causes external to the user. In concrete terms, as the first decision processing, the cause estimation processing unit 126 performs processing that includes at least one of the processing of steps S5001 through S5010 of FIG. 5 and of steps S5011, S5016, S5018, and S5019 of FIG. 6, and the respectively corresponding processing of steps S5201 through S5210 of FIG. 5 and of steps S5211, S5216, S5218, and S5219 of FIG. 6. Moreover, as the second decision processing, the cause estimation processing unit 126 performs processing that includes at least one of the processing of steps S5012 through S5015 and S5017 of FIG. 6 and the respectively corresponding processing of steps S5212 through S5215 and S5217 of FIG. 6. Since it is arranged to do this, accordingly it is possible to estimate, as causes of dangerous driving, not only dangerous driving factors that originate in the user, but also dangerous driving factors that originate in causes external to the user.

(6) The telematics center 100 further comprises the blame ratio calculation unit 127 that calculates the blame ratio of the user in respect of dangerous driving. And, as shown in the screen examples of FIG. 10B and FIG. 10C, it is desirable for the result of diagnosis of driving characteristics that are outputted from the diagnosis result output unit 129 to include information specifying the blame ratio for the user as calculated by the blame ratio calculation unit 127. Due to this, it is possible to provide diagnosis result for driving characteristics that carry a high degree of conviction to the user.

(7) In steps S5001 through S5010 and S5201 through S5210 of FIG. 5 and in steps S5011 through S5019 and S5211 through S5219 of FIG. 6, the cause estimation processing unit 126 estimates respective causes of dangerous driving on the basis of predetermined conditions that are set for each of various dangerous driving factors. And the blame ratio calculation unit 127 calculates a blame ratio or an external cause influence rate for each of these dangerous driving factors in steps S7000 and S7010 of FIG. 7, and then, on the basis of the blame ratios and the influence rates that have thus been calculated, calculates an overall blame ratio for the user in step S7020. Since these arrangements are adopted, accordingly it is possible to calculate an overall blame ratio of the user in an accurate manner for dangerous driving factors of various types, such as dangerous driving factors originating in the user himself and dangerous driving factors originating in the external cause external to the user.

(8) The telematics center 100 comprises: the probe information acquisition unit 121 that acquires the probe information 132 related to the operational state of the vehicle from the in-vehicle device 200; the dangerous driving detection processing unit 125 that detects dangerous driving by the user of the vehicle on the basis of the probe information 132 acquired by the probe information acquisition unit 121; the blame ratio calculation unit 127 that calculates a blame ratio of the user for dangerous driving; the driving characteristics diagnosis processing unit 128 that performs diagnosis of driving characteristics for the user on the basis of the result of dangerous driving as detected by the dangerous driving detection processing unit 125 and the blame ratio for the user as calculated by the blame ratio calculation unit 127; and the diagnosis result output unit 129 that outputs the result of diagnosis of driving characteristics that has been diagnosed by the driving characteristics diagnosis processing unit 128. Since these arrangements are provided, accordingly it is possible to perform diagnosis of driving characteristics and output of information in consideration of the influence of external causes, so that a high level of conviction will be conveyed to the user.

(9) The telematics center 100 further comprises the cause estimation processing unit 126 that estimates the cause of dangerous driving on the basis of predetermined conditions that are set for each driving factor by executing the processing of steps S5001 through S5010 and S5201 through S5210 of FIG. 5 and the processing of steps S5011 through S5019 and S5211 through S5219 of FIG. 6. In steps S7000 and S7010 of FIG. 7, the blame ratio calculation unit 127 calculates the blame ratio for the user or the external cause influence rate for each of these dangerous driving factors, and then in step S7020 calculates an overall blame ratio for the user on the basis of these blame ratios and these influence rates that have thus been calculated. Since these arrangements are adopted, accordingly it is possible to calculate an overall blame ratio of the user for dangerous driving factors of various types, such as dangerous driving factors originating in the user himself and dangerous driving factors originating in the external cause external to the user.

(10) In the cause estimation processing shown in FIG. 5 and FIG. 6, the cause estimation processing unit 126 estimates the cause of dangerous driving by performing the first decision processing in order to determine upon the presence or absence of dangerous driving factors that originate in the user, and the second decision processing in order to determine upon the presence or absence of dangerous driving factors that originate in causes external to the user. In concrete terms, as the first decision processing, the cause estimation processing unit 126 performs processing that includes at least one of the processing of steps S5001 through S5010 of FIG. 5 and of steps S5011, S5016, S5018, and S5019 of FIG. 6, and the respectively corresponding processing of steps S5201 through S5210 of FIG. 5 and of steps S5211, S5216, S5218, and S5219 of FIG. 6. Moreover, as the second decision processing, the cause estimation processing unit 126 performs processing that includes at least one of the processing of steps S5012 through S5015 and S5017 of FIG. 6 and the respectively corresponding processing of steps S5212 through S5215 and S5217 of FIG. 6. In step S7000 of FIG. 7, the blame ratio calculation unit 127 calculates the blame ratio of the user in respect of the dangerous driving factor or factors that were determined in the first decision processing described above, and, in step S7020, calculates the influence rates of external causes upon the dangerous driving factor or factors that were determined in the second decision processing described above. Due to the adoption of these arrangements, it is possible to calculate suitable evaluation values for various causes such as dangerous driving factors originating in the user himself and dangerous driving factors originating in the external cause external to the user, and accordingly it is possible to calculate the blame ratio for the user and/or the influence rates of external causes.

(11) As shown in the screen examples of FIG. 10B and FIG. 10C, it is desirable for the result of diagnosis of driving characteristics that are outputted from the diagnosis result output unit 129 to include information specifying the date and time and the location at which dangerous driving was detected, information specifying the details of the dangerous driving, and information specifying the blame ratio for the user in respect of that dangerous driving. Moreover, as shown in the screen examples of FIG. 18A and FIG. 18B, it would also be possible to include information about the automobile insurance premium corresponding to the history of detection of dangerous driving by the user and the blame ratio for the user. According to these arrangements, it is possible to present the result of driving characteristics diagnosis to the user in an easily understandable manner.

(12) It would also be possible to arrange for the diagnosis result output unit 129 to cause the processing of steps S3102 and S3103 of FIG. 3 to be executed and to output the result of diagnosis of driving characteristics shortly after dangerous driving has been detected, or when driving of the vehicle has been resumed after dangerous driving has been detected. If this is done, then, when the user has performed dangerous driving, it is possible to urge him to be more careful in an effective manner and at an appropriate timing.

(13) The driving characteristics diagnosis system according to the embodiment of the present invention comprises the telematics center 100 described above and the in-vehicle device 200 that is connected to the telematics center 100. And the telematics center 100 receives the probe information 232 related to the operational state of the vehicle from the in-vehicle device 200 in step S2101 of FIG. 2, and transmits to the in-vehicle device 200 the result of diagnosis of driving characteristics for the user outputted from the diagnosis result output unit 129 in step S3103 of FIG. 3. On the other hand, the in-vehicle device 200 comprises the communication unit 140 that transmits the probe information 232 related to the operational state of the vehicle to the telematics center 100 and receives the result of diagnosis of driving characteristics for the user from the telematics center 100, and the diagnosis result display processing unit 227 that performs display processing for displaying the result of diagnosis of driving characteristics that have been received by the communication unit 140. Since these arrangements are adopted, accordingly, by the user employing the in-vehicle device 200, it is possible for information related to the operational state of the vehicle to be transmitted reliably to the telematics center 100 as probe information 232. Moreover, it is also possible to display the result of diagnosis of driving characteristics on the in-vehicle device 200, thus presenting the result to the user in an easily understandable manner.

Variation 1

Figure 19:
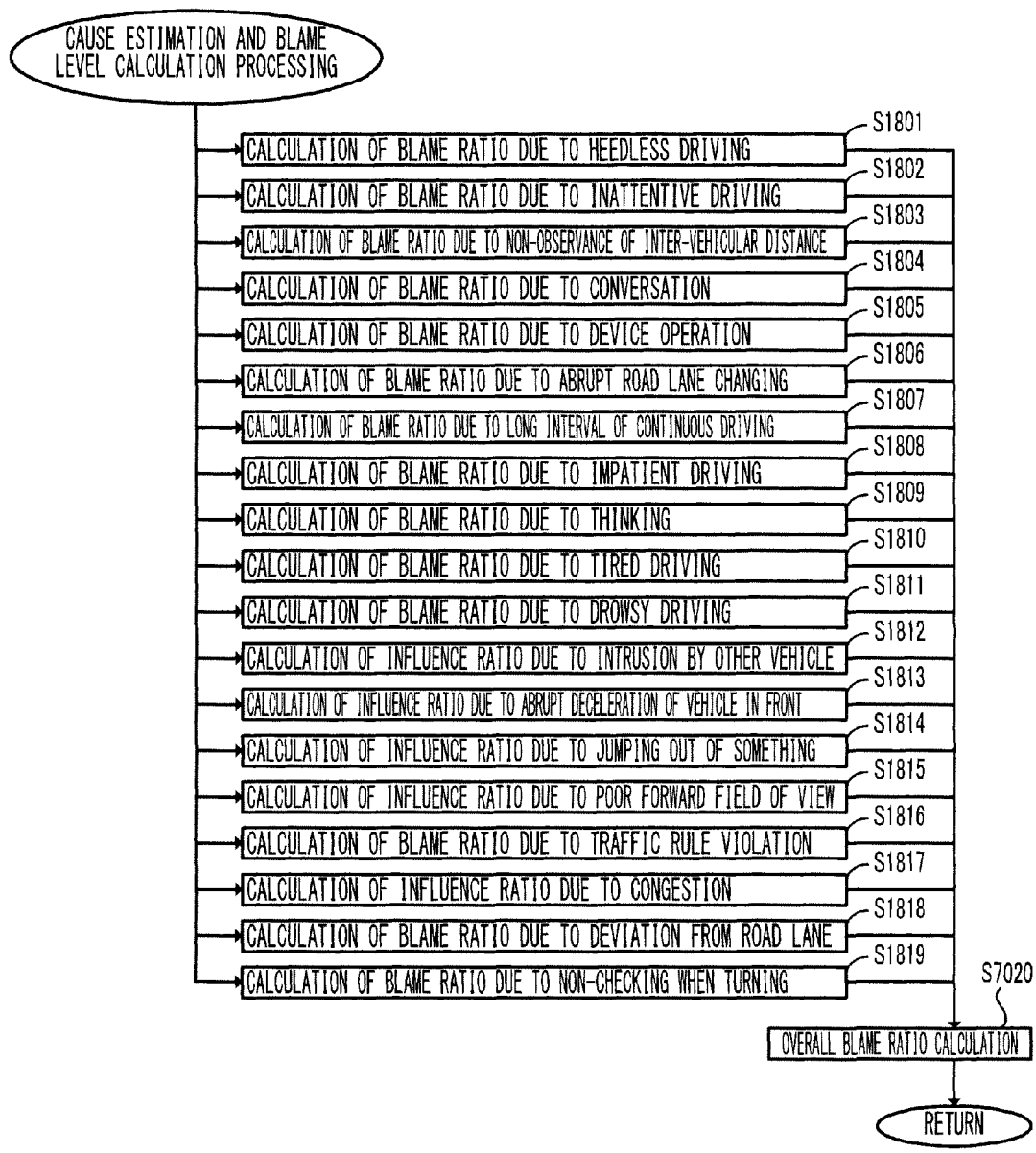
FIG. 19 is a flow chart showing a flow of processing when cause estimation processing and blame ratio calculation processing are performed together.

It should be understood that while, in the embodiment explained above, an example was explained in which two separate and distinct processing stages were performed for the cause estimation processing shown in FIG. 5 and FIG. 6 and for the blame ratio calculation processing shown in FIG. 7. However, it would also be possible to combine these processing stages and to perform only one combined process. FIG. 19 is a flow chart showing a flow of processing when the cause estimation processing and the blame ratio calculation processing are combined together.

In the flow chart of FIG. 19, the cause estimation processing unit 126 and the blame ratio calculation unit 127 perform the processing of steps S1801 through S1819 in cooperation. On the basis of the result of this processing, the blame ratio calculation unit 127 calculates an overall blame ratio for the user in step S7020. It should be understood that the processing of steps S1801 through S1819 of FIG. 19 corresponds to the processing of steps S5001 through S5010 of FIG. 5 and the processing of steps S5011 through S5019 of FIG. 6, and to the processing of steps S5201 through S5210 of FIG. 5 and the processing of steps S5211 through S5219 of FIG. 6. Moreover, the processing of steps S1801 through S1811, S1816, S1818, and S1819 of FIG. 19 corresponds to step S7000 of FIG. 7, while the processing of steps S1812 through S1815 and S1817 of FIG. 19 corresponds to step S7010 of FIG. 7.

Variation 2

Furthermore, in the driving characteristics diagnosis system according to the present invention, it would also be acceptable to add other structural elements to the structural elements of the telematics center 100 and/or the in-vehicle device 200 shown in FIG. 1, or to eliminate any desired structural elements from the structural elements of the telematics center 100 and/or the in-vehicle device 200 shown in FIG. 1. For example, if a smart phone is used as the in-vehicle device 200, then the inter-vehicular distance measurement device 208, the proximity measurement device 209, the vehicle information acquisition device 210, the gaze measurement device 211, the biological information measurement device 212, and so on may be omitted. In this case, it would be possible to arrange to substitute the camera 206 for the inter-vehicular distance measurement device 208, the proximity measurement device 209, the gaze measurement device 211, and so on.

It should be understood that, if the in-vehicle device 200 has a structure such as that described above, then the types of information which the in-vehicle device 200 is able to acquire as the probe information 232 will be limited, as compared with the embodiment described above. For example, it will not be possible for operational information about devices mounted to the subject vehicle or biological information of the user to be acquired by the in-vehicle device 200. Accordingly, it will not be possible for the processing of steps S5005 and S5205, the processing of steps S5009 and S5209, and the processing of steps S5010 and S5210 to be performed by the telematics center 100 on the basis of such information. However, since it will be possible to execute processing for the dangerous driving factors other than these, accordingly it will be possible to perform diagnosis of the driving characteristics of the user on the basis of the result of that processing.

The embodiment and the variations described above have only been given as examples, and the present invention is not to be considered as being limited by the details thereof, provided that the essential characteristics of the present invention are preserved. Thus, the present invention is not limited to the embodiments described above; various changes are possible, provided that the gist of the present invention is not lost.

What is claimed is:

1. A driving characteristics diagnosis device having a hardware processor, comprising:
    an information acquisition unit that acquires information relating to an operational state of an automobile;

a driving detection processing unit that detects a predefined manner of driving by a user of the automobile on the basis of information acquired by the information acquisition unit;

a cause estimation processing unit that estimates a cause of the predefined manner of driving by performing (i) a first decision processing to determine the cause based on a presence or an absence of a first driving factor originating in the user, and (ii) a second decision processing to determine the cause based on a presence or an absence of a second driving factor originating in an external cause external to the user;

a driving characteristics diagnosis processing unit that performs diagnosis of driving characteristics for the user on the basis of a result of detection of the predefined manner of driving by the driving detection processing unit and the cause of the predefined manner of driving estimated by the cause estimation processing unit; and a diagnosis result output unit that outputs the result of the diagnosis of driving characteristics diagnosed by the driving characteristics diagnosis processing unit, wherein the second decision processing comprises at least one of a processing of making a decision as to whether another automobile has unreasonably intruded in front of the automobile, a processing of making a decision as to whether another automobile in front of the automobile has performed an abrupt deceleration, a processing of making a decision as to whether something has jumped out in front of the automobile, a processing of making a decision as to whether a forward field of view from the automobile is poor, or a processing of making a decision as to whether a congestion is occurring at a ground point where the automobile is traveling.

2. The driving characteristics diagnosis device according to claim 1, wherein the result of the driving characteristics diagnosis include information specifying the date, the time, and the location at which the predefined manner of driving was detected, information specifying the details of the predefined manner of driving, and information specifying the cause of the predefined manner of driving.

3. The driving characteristics diagnosis device according to claim 2, wherein the result of the driving characteristics diagnosis further includes information specifying driving advice to the user in relation to the predefined manner of driving.

4. The driving characteristics diagnosis device according to claim 1, wherein the cause estimation processing unit estimates the cause of the predefined manner of driving on the basis of at least one of: information that has been acquired in relation to the automobile; weather information corresponding to a traveling position of the automobile; map information corresponding to the traveling position of the automobile; and road traffic information corresponding to the traveling position of the automobile.

5. A system comprising:

a storage device; and a hardware processor coupled to the storage device, the hardware processor configured to:

acquire information relating to an operational state of an automobile;

detect a predefined manner of driving by a user of the automobile based on the acquired information;

estimate a cause of the predefined manner of driving by performing (i) a first decision processing to determine the cause based on a presence or an absence of a first driving factor originating in the user, and (ii) a second decision processing to determine the cause based on a presence or an absence of a second driving factor originating in an external cause external to the user;

perform diagnosis of driving characteristics for the user on the basis of a result of detection of the predefined manner of driving and the cause of the predefined manner of driving; and output a result of the diagnosis of driving characteristics after performing the diagnosis of driving characteristics for the user, wherein the second decision processing comprises at least one of a processing of making a decision as to whether another automobile has unreasonably intruded in front of the automobile, a processing of making a decision as to whether another automobile in front of the automobile has performed an abrupt deceleration, a processing of making a decision as to whether something has jumped out in front of the automobile, a processing of making a decision as to whether a forward field of view from the automobile is poor, or a processing of making a decision as to whether a congestion is occurring at a ground point where the automobile is traveling.

6. The driving characteristics diagnosis device of claim 1, wherein the first decision processing comprises at least one of a processing of making a decision as to whether the user has performed heedless driving, a processing of making a decision as to whether the user has performed inattentive driving, a processing of making a decision as to whether the user has observed an appropriate intervehicular distance between the automobile and another automobile in front, a processing of making a decision as to whether the user has been conversing while driving, a processing of making a decision as to whether the user has operated a device while driving, a processing of making a decision as to whether the user has abruptly changed the automobile between road lanes, a processing of making a decision as to whether the user has performed driving over a long time interval, a processing of making a decision as to whether the user has performed impatient driving, a processing of making a decision as to whether the user has performed distracted driving, a processing of making a decision as to whether the user is tired, a processing of making a decision as to whether the user has performed drowsy driving, a processing of making a decision as to whether the user has committed a traffic violation, a processing of making a decision as to whether the automobile has changed road lane contrary to the intention of the user, or a processing of making a decision as to whether the user has performed checking while turning.

7. The driving characteristics diagnosis device according to claim 1, further comprising a blame ratio calculation unit that calculates a blame ratio to be attributed to the user for the predefined manner of driving; and wherein the result of diagnosis of the driving characteristics further includes information specifying the blame ratio calculated by the blame ratio calculation unit.

8. The driving characteristics diagnosis device according to claim 7, wherein:

the cause estimation processing unit estimates the cause of the predefined manner of driving on the basis of predetermined conditions that are set for each driving factor; and the blame ratio calculation unit calculates the blame ratio for the user or the external cause influence rate for each driving factor, and calculates an overall blame ratio to be attributed to the user on the basis of the blame ratios and the influence rates that have thus been calculated.

9. A driving characteristics diagnosis system comprising:
the driving characteristics diagnosis device according to claim 1, and
a terminal device that is connected to the driving characteristics diagnosis device, wherein:
the driving characteristics diagnosis device receives information related to the operational state of the automobile from the terminal device, and transmits to the terminal device the result of the diagnosis of driving characteristics for the user outputted from the diagnosis result output unit; and
the terminal device comprises:
a communication unit that transmits information related to the operational state of the automobile to the driving characteristics diagnosis device, and receives the result of the diagnosis of driving characteristics for the user from the driving characteristics diagnosis device; and
a diagnosis result display processing unit that performs display processing for displaying the result of the diagnosis of driving characteristics that have been received by the communication unit.

10. The system of claim 5, wherein the first decision processing comprises at least one of a processing of making a decision as to whether the user has performed heedless driving, a processing of making a decision as to whether the user has performed inattentive driving, a processing of making a decision as to whether the user has observed an appropriate inter-vehicular distance between the automobile and another automobile in front, a processing of making a decision as to whether the user has been conversing while driving, a processing of making a decision as to whether the user has operated a device while driving, a processing of making a decision as to whether the user has abruptly changed the automobile between road lanes, a processing of making a decision as to whether the user has performed driving over a long time interval, a processing of making a decision as to whether the user has performed impatient driving, a processing of making a decision as to whether the user has performed distracted driving, a processing of making a decision as to whether the user is tired, a processing of making a decision as to whether the user has performed drowsy driving, a processing of making a decision as to whether the user has committed a traffic violation, a processing of making a decision as to whether the automobile has changed road lane contrary to the intention of the user, or a processing of making a decision as to whether the user has performed checking while turning.

* * * * *